United States Patent
Kelada

(10) Patent No.: US 9,156,003 B2
(45) Date of Patent: Oct. 13, 2015

(54) METHODS OF MAKING A HOLLOW FIBER MEMBRANE ELEMENT ADAPTED FOR USE IN WATER TREATMENT AND OSMOTIC PROCESSES

(71) Applicant: Maher Isaac Kelada, Houston, TX (US)

(72) Inventor: Maher Isaac Kelada, Houston, TX (US)

( * ) Notice: Subject to any disclaimer, the term of this patent is extended or adjusted under 35 U.S.C. 154(b) by 0 days.

(21) Appl. No.: 14/593,777

(22) Filed: Jan. 9, 2015

(65) Prior Publication Data

US 2015/0157983 A1 Jun. 11, 2015

Related U.S. Application Data

(60) Division of application No. 14/175,073, filed on Feb. 7, 2014, now Pat. No. 8,974,668, which is a continuation-in-part of application No. 13/768,228, filed on Feb. 15, 2013, now abandoned.

(60) Provisional application No. 61/765,268, filed on Feb. 15, 2013.

(51) Int. Cl.
| | |
|---|---|
| *B01D 63/02* | (2006.01) |
| *B01D 63/04* | (2006.01) |
| *B01D 67/00* | (2006.01) |
| *B01D 69/08* | (2006.01) |
| *C02F 1/44* | (2006.01) |

(52) U.S. Cl.
CPC ............ *B01D 63/022* (2013.01); *B01D 63/021* (2013.01); *B01D 63/026* (2013.01); *B01D 63/043* (2013.01); *B01D 2313/20* (2013.01);
(Continued)

(58) Field of Classification Search
CPC .................. Y10T 29/49826; Y10T 156/1062; B01D 2313/20; B01D 2313/21; B01D 2319/022; B01D 63/021; B01D 63/022; B01D 63/026; B01D 63/043; B01D 2313/14; B01D 2313/04; Y02W 10/37; C02F 1/44; Y02E 10/36; Y02E 50/346
See application file for complete search history.

(56) References Cited

U.S. PATENT DOCUMENTS

| | | |
|---|---|---|
| 3,133,132 A | 5/1964 | Loeb |
| 3,423,491 A | 1/1969 | McLain |

(Continued)

FOREIGN PATENT DOCUMENTS

| | | |
|---|---|---|
| WO | 2008/060435 | 5/2008 |
| WO | 2012/074887 | 7/2012 |

OTHER PUBLICATIONS

Ramon, et al., "Membrane-Based Production of Salinity-Gradient Power," 2011, Energy & Environmental Science, [12 pages].

(Continued)

*Primary Examiner* — John Kim

(57) ABSTRACT

A method of making a membrane element adapted for use in water treatment and osmotic pressures, the method comprises providing a plurality of spacer structures having given dimension, placing one or more spacer structures on a hollow fiber ("HF") assembly platform, extending rows of HFs with spaces having given width therebetween over the one or more spacer structures aligned with the longitudinal axis of the HF assembly platform, forming a membrane element comprising a stack of alternating rows of HFs and intervening spacer structures wherein each HF comprises a hydrophilic semipermeable membrane being adapted to achieve salt rejection of 98.5% or more and exhibiting a surface tension of 35 dynes/cm or more and the given dimensions, a first width and a second width are effective to maintain a Reynolds Number of 3000 or more and the stack maintaining a mechanical integrity at feed pumping pressure of 30 bars or higher.

20 Claims, 21 Drawing Sheets

(52) U.S. Cl.
CPC ....... *B01D 2313/21* (2013.01); *B01D 2319/022* (2013.01); *C02F 1/44* (2013.01); *Y02E 10/36* (2013.01); *Y02E 50/346* (2013.01); *Y02W 10/37* (2015.05); *Y10T 29/49826* (2015.01); *Y10T 156/1062* (2015.01)

(56) References Cited

U.S. PATENT DOCUMENTS

| | | | |
|---|---|---|---|
| 3,674,628 A | 7/1972 | Fabre | |
| 3,906,250 A | 9/1975 | Loeb | |
| 3,978,344 A | 8/1976 | Jellinek | |
| 3,993,816 A * | 11/1976 | Baudet et al. | 428/45 |
| 4,056,467 A | 11/1977 | Christen | |
| 4,115,492 A | 9/1978 | Mahoney | |
| 4,193,267 A | 3/1980 | Loeb | |
| 4,209,307 A | 6/1980 | Leonard | |
| 4,211,597 A * | 7/1980 | Lipps et al. | 156/245 |
| 4,219,517 A | 8/1980 | Kesting | |
| 4,283,913 A | 8/1981 | Loeb | |
| 4,340,481 A | 7/1982 | Mishiro | |
| 4,364,759 A | 12/1982 | Brooks | |
| 4,769,146 A | 9/1988 | Schmidt | |
| 5,104,535 A * | 4/1992 | Cote et al. | 210/321.8 |
| 5,137,631 A | 8/1992 | Eckman | |
| 5,192,478 A | 3/1993 | Caskey | |
| 5,306,428 A | 4/1994 | Tonner | |
| 5,380,433 A | 1/1995 | Etienne | |
| 5,639,373 A * | 6/1997 | Mahendran et al. | 210/636 |
| 5,762,798 A | 6/1998 | Wenthold | |
| 6,001,262 A | 12/1999 | Kelada | |
| 6,126,815 A | 10/2000 | Kelada | |
| 6,185,940 B1 | 2/2001 | Prueitt | |
| 6,245,228 B1 | 6/2001 | Kelada | |
| 6,313,545 B1 | 11/2001 | Finley et al. | |
| 6,354,444 B1 | 3/2002 | Mahendran | |
| 6,559,554 B2 | 5/2003 | Finley et al. | |
| 6,783,008 B2 | 8/2004 | Zha | |
| 6,790,360 B1 * | 9/2004 | Pedersen et al. | 210/636 |
| 7,303,674 B2 | 12/2007 | Lampi et al. | |
| 7,329,962 B2 | 2/2008 | Alstot et al. | |
| 7,727,393 B2 | 6/2010 | Lee | |
| 7,862,719 B2 | 1/2011 | McMahon | |
| 8,029,671 B2 | 10/2011 | Cath et al. | |
| 8,075,776 B2 | 12/2011 | Mahendran | |
| 8,099,958 B2 | 1/2012 | Al-Mayahi et al. | |
| 8,123,948 B2 | 2/2012 | Jensen | |
| 2003/0164613 A1 | 9/2003 | Finley et al. | |
| 2008/0169723 A1 | 7/2008 | Thorsen et al. | |
| 2008/0190848 A1 | 8/2008 | Oklejas | |
| 2008/0230376 A1 | 9/2008 | Brauns | |
| 2010/0032377 A1 | 2/2010 | Wohlert | |
| 2010/0183903 A1 | 7/2010 | McGinnis et al. | |
| 2011/0044824 A1 | 2/2011 | Kelada | |
| 2011/0100218 A1 | 5/2011 | Wolfe | |
| 2011/0127209 A1 | 6/2011 | Rogers et al. | |
| 2011/0133487 A1 | 6/2011 | Oklejas, Jr. | |
| 2012/0012511 A1 | 1/2012 | Kim et al. | |

OTHER PUBLICATIONS

Wikipedia, the free encyclopedia. (2012). "Osmotic Power." Retrieved on Oct. 8, 2012 from http://en.wikipedia.org/w/index.php?title=Osmotic_power&priintable=yes [8 pages].

Statkraft. (n.d.). "The Prototype: Torte Prototype Plant." Retrieved on Sep. 24, 2012 from http://www.statkraft.com/energy-sources/osmotic-pwer/prototype. [2 pages].

Nitto Denko. (2011). "Nitto Denko/Hydranautics and Statkraft to Create Osmotic Power." Retrieved on Oct. 8, 2012 from http://www.nitto.com/dpage/184.html. [3 pages].

The International Desalination & Water Reuse Quarterly Industry website. (2011). "Hydranautics to Supply Osmotic-Power Developer Statkraft." Retrieved on Oct. 8, 2012 from http:www.desalination.biz/news/. [3 pages].

Crystal Equity Research: Small Cap Strategist. (2012). "Statkraft's Foray into Osmotic Power." Retrieved on Oct. 8, 2012 from http://crystalequityresearch.blogspot.com/2012/08/statkrafts-foray-into-osmotic-power.html. [3 pages].

Altheokay. (2012). "Osmotic Power Generation: Energy, Technology & Policy." Retrieved on Oct. 8, 2012 from http://webberenergyblog.wordpress.com/2012/04/01osmotic-poer-generation/. [3 pages].

Stein Erik Skilhagen, Head of Osmotic Power, Statkraft. International Desalination Association Conference, "Osmotic Power—Developing a New, Renewable Energy Source," Nov. 2-3, 2010. [17 pages].

Werner Kofod Nielsen, Senior Advisor, Statkraft. 2011 Quingdao International Conference on Desalination and Water Reuse. "Progress in the Development of Osmotic Power." [24 pages].

United States Patent & Trademark Office (USPTO), "Restriction Requirement," U.S. Appl. No. 12/543,264 mailed May 31, 2012. [11 pages].

The Morris Law Firm, P.C. (MLF), "Response to Restriction Requirement," U.S. Appl. No. 12/543,264 mailed Jun. 15, 2012. [17 pages].

USPTO, "Non-Final Office Action," U.S. Appl. No. 12/543,264 mailed Sep. 18, 2012. [20 pages].

MLF, "Response to Non-Final Office Action," U.S. Appl. No. 12/543,264 mailed Oct. 12, 2012. [9 pages].

USPTO, "Non-Final Office Action," U.S. Appl. No. 12/543,264 mailed Jan. 14, 2013. [14 pages].

MLF, "Amended Response to First Substantive Office Action mailed Jan. 14, 2013" [13 pages].

USPTO, "Final Office Action," U.S. Appl. No. 12/543,264 mailed Jun. 20, 2013 [6 pages].

MLF, "Response to Final Action," U.S. Appl. No. 12/543,264 mailed Jun. 24, 2013 [4 pages].

USPTO, "Notice of Allowance and Fees Due," U.S. Appl. No. 12/543,264 mailed Jul. 5, 2013 [10 pages].

MLF, "Transmittal of New Application," U.S. Appl. No. 13/974,520, filed Aug. 23, 2013 [83 pages].

USPTO, "Restriction Requirement," U.S. Appl. No. 13/974,520 mailed Feb. 20, 2014 [9 pages].

MLF, "Response to Restriction Requirement," U.S. Appl. No. 13/974,520, filed Mar. 14, 2014 [7 pages].

USPTO, "Non-Final Rejection," U.S. Appl. No. 13/974,520 mailed Apr. 1, 2014 [18 pages].

MLF, "Transmittal of New Application," U.S. Appl. No. 13/768,228, filed Feb. 15, 2013 [42 pages].

USPTO, "Non-Final Rejection," U.S. Appl. No. 13/768,228 mailed Jun. 18, 2013 [22 pages].

MLF, "Response to Non-Final Rejection," U.S. Appl. No. 13/768,228 mailed Aug. 7, 2013 [19 pages].

MLF, "Response to Final Action," U.S. Appl. No. 13/768,228 mailed Oct. 14, 2013 [43 pages].

USPTO, "Advisory Action," U.S. Appl. No. 13/768,228 mailed Oct. 21, 2013 [5 pages].

MLF, "Response to Advisory Action," U.S. Appl. No. 13/768,228 mailed Nov. 11, 2013 [33 pages].

USPTO, "Non-Final Rejection," U.S. Appl. No. 13/768,228 mailed Dec. 5, 2013 [22 pages].

MLF, "Provisional Application," U.S. Appl. No. 61/765,268, filed Feb. 15, 2013 [79 pages].

PCT International Searching Authority, Korean Intellectual Property Office, "Notification of Transmittal of the International Search Report and the Written Opinion of the International Searching Authority, or the Declaration," PCT Serial No. PCT/IB2014/058861 mailed May 26, 2014. [17 pages].

Statkraft. (n.d.). "Statkraft and Nitto Denko/Hydranautics Cooperates to Make Osmotic Power Reality." Retrieved on Jul. 3, 2014 from http://www.statkraft.com/media/press-releases/Press-releases-archive/2011/Statkraft-and-Nitto-DenkoHydranautics-cooperates-to-make-osmotic-power-reality/. [8 pages].

* cited by examiner

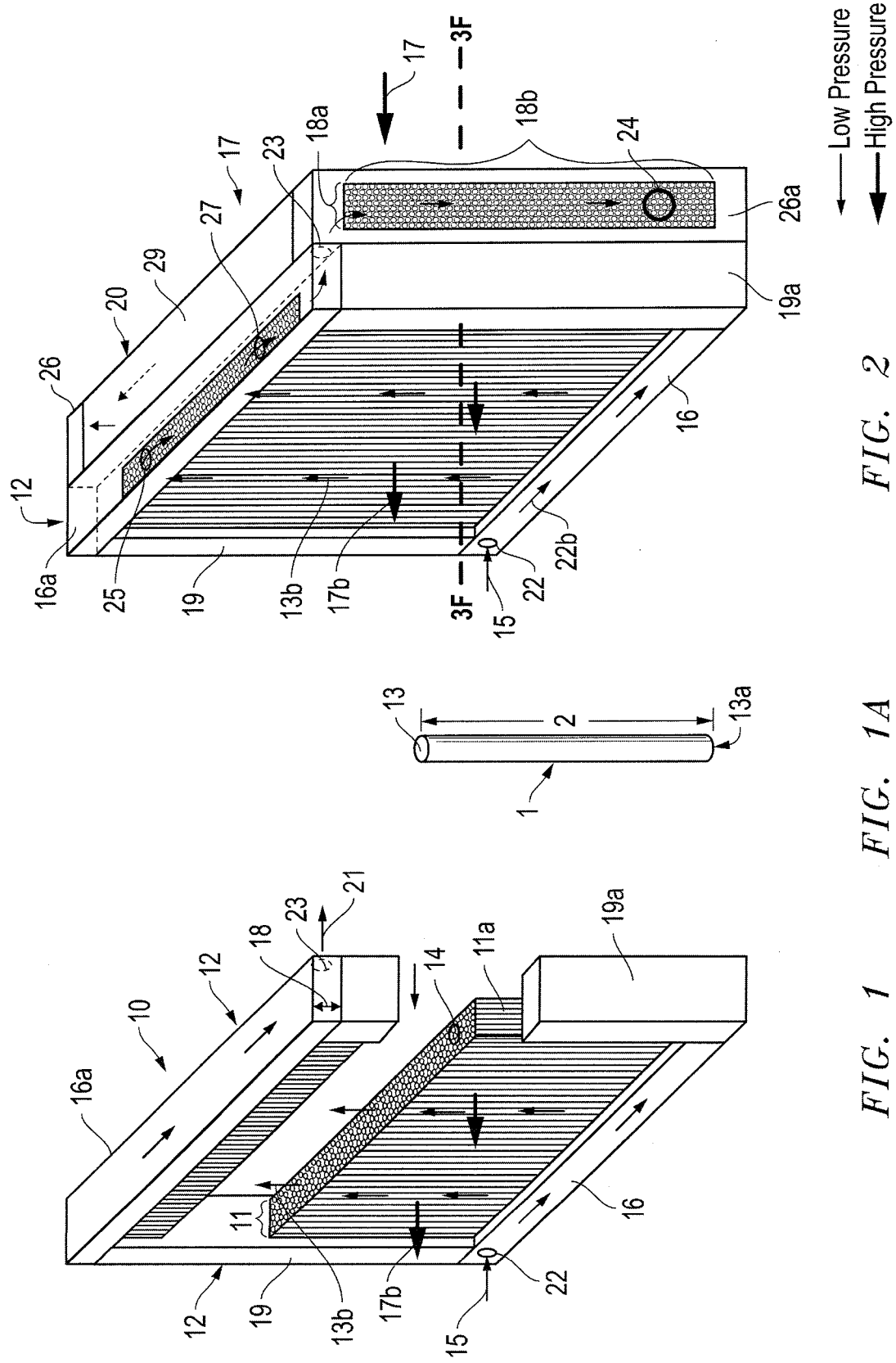

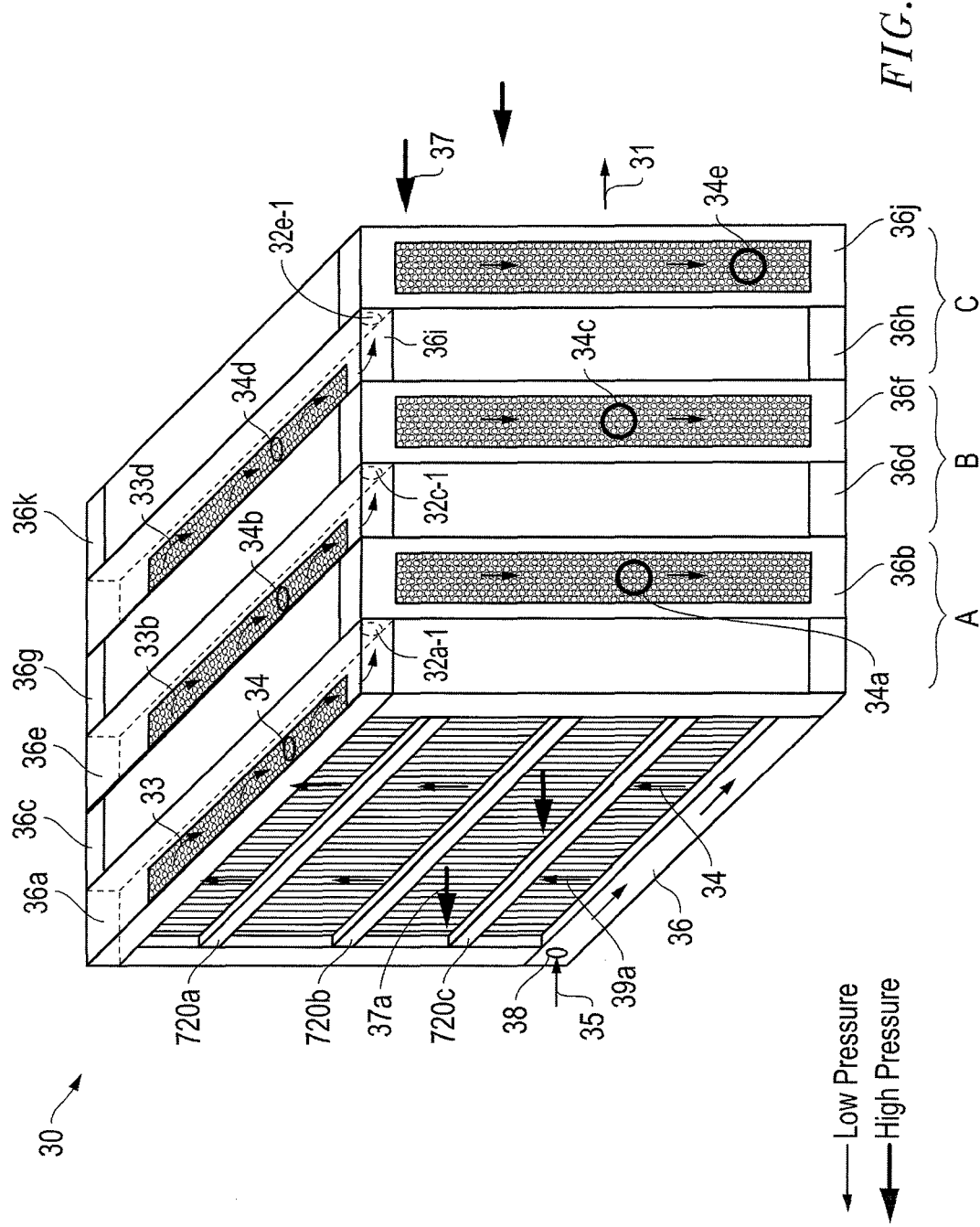

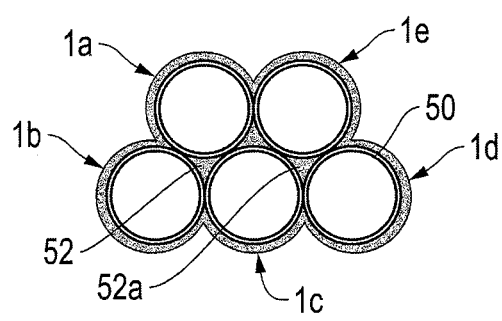
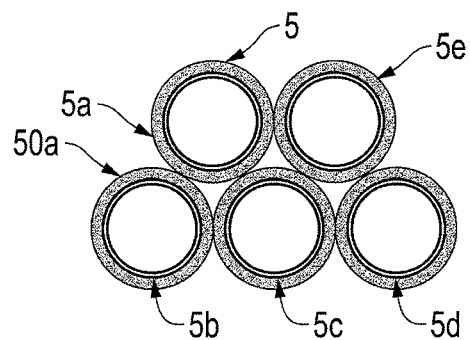
*FIG. 4*  *FIG. 5*
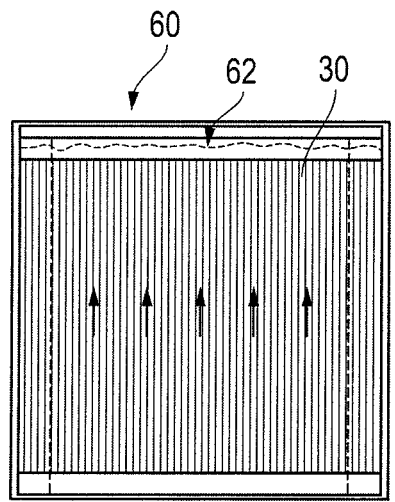
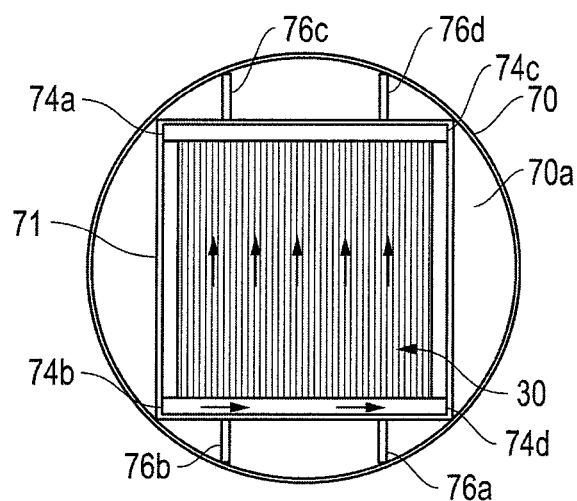
*FIG. 6*  *FIG. 7*

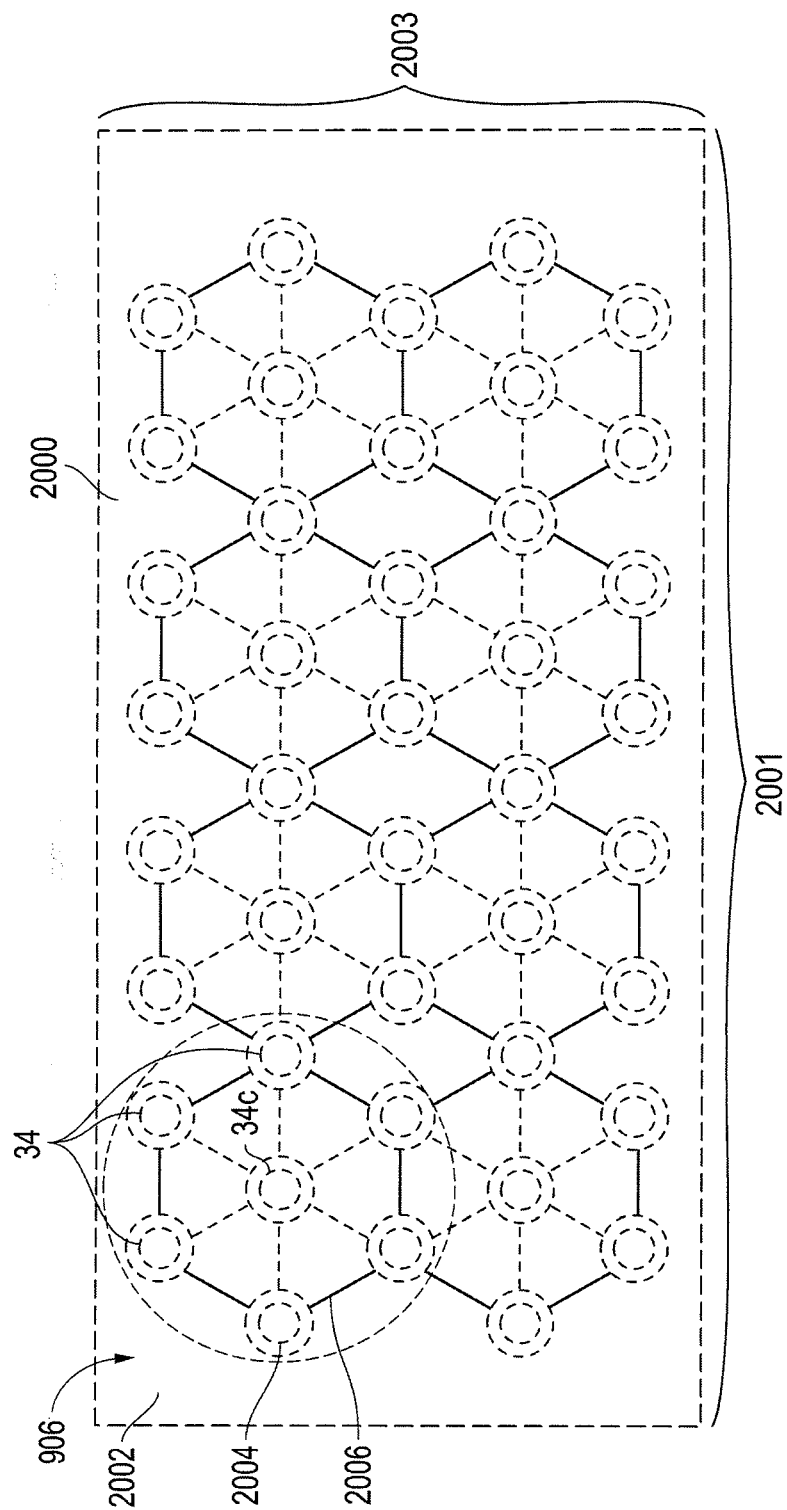
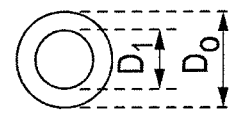
FIG. 8A
FIG. 8

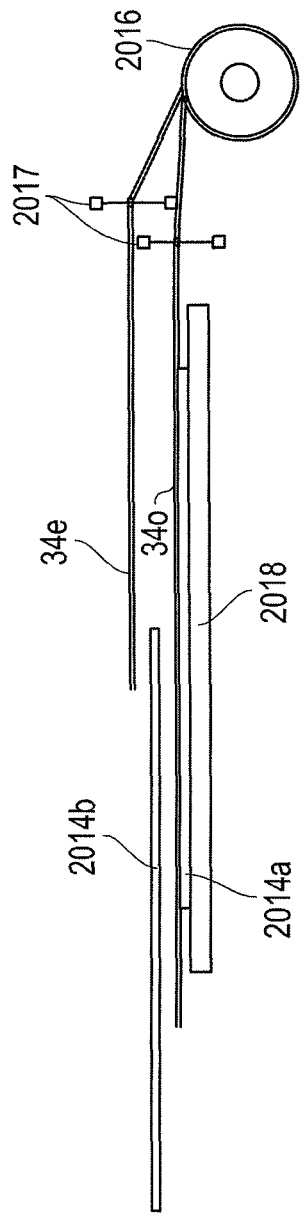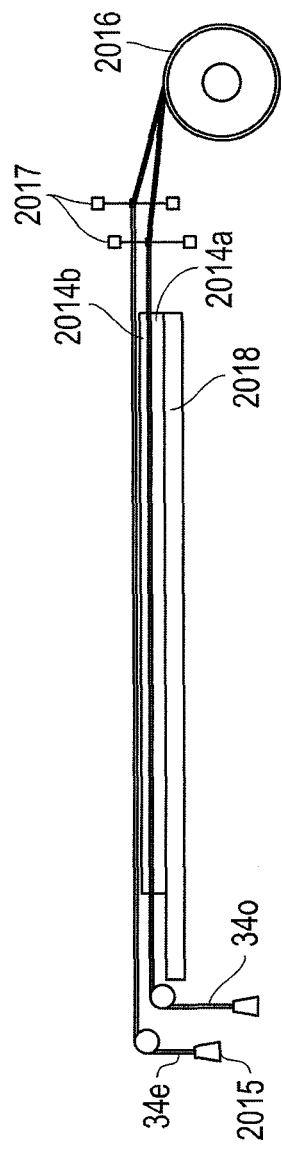

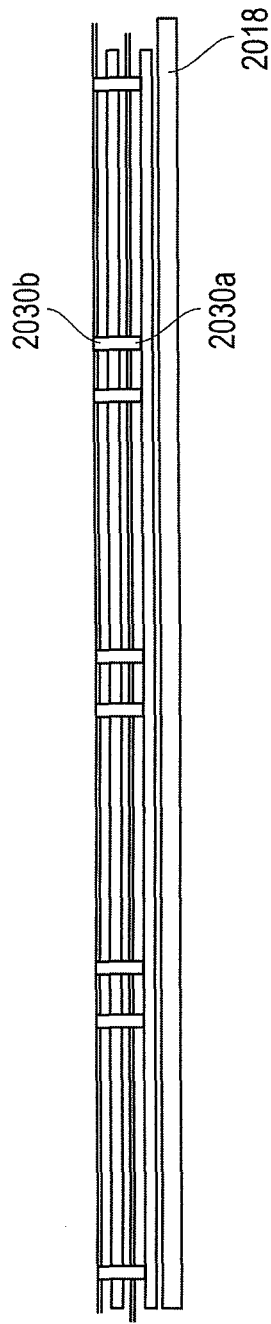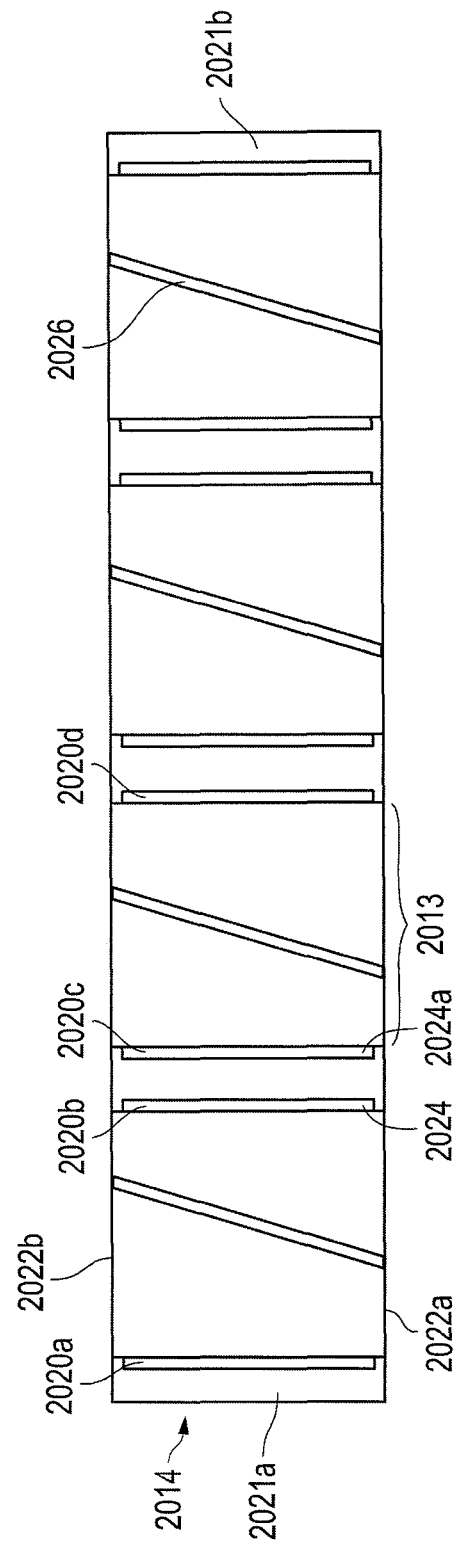

METHODS OF MAKING A HOLLOW FIBER MEMBRANE ELEMENT ADAPTED FOR USE IN WATER TREATMENT AND OSMOTIC PROCESSES

REFERENCE TO RELATED APPLICATIONS

The present application is a divisional of U.S. patent application Ser. No. 14/175,073, U.S. Pat. No. 8,974,668, which is a continuation-in-part of U.S. patent application Ser. No. 13/768,228, filed Feb. 15, 2013 (abandoned), which claims the benefit of U.S. Provisional Application Ser. No. 61/765,268, also filed Feb. 15, 2013. The present application incorporates principles published in United States Publication Number 2011/0044824, issuing/issued Oct. 1, 2013, as U.S. Pat. No. 8,545,701, the full text of which is incorporated herein by reference.

FIELD OF THE INVENTION

The present application provides a unique hollow fiber (HF) or tubular semipermeable membrane element (hereafter "HF membrane element"), apparati comprising the HF membrane element, and methods for making the HF membrane element and apparatus.

BACKGROUND

Osmosis has been used to treat industrial wastewaters, to concentrate landfill leachate, and to treat liquid foods in the food industry with low salinity content. Recent developments in material science also have allowed the use of osmosis in controlled drug release and in dialysis.

Compared to other industrial separation processes, osmosis has the advantage of operating at low to no hydraulic pressure; rejecting a wide range of contaminants; possibly having a lower membrane fouling propensity; and, using relatively simple, basic equipment.

Attempts have been made to use osmosis to generate power, but with limited success. One problem lies in the design of conventional semipermeable membrane elements, known commercially as modules or vessels. Currently available semipermeable membrane elements comprise tubular cylinders with relatively small bores, typically around 200 mm (8 inches) or less. A typical length of the currently available semipermeable membrane elements is only from about 1000-1500 mm.

Larger scale osmosis plants than those currently in existence, such as large scale power generation plants, would handle massive quantities of brine and produce large in-situ changes in flow rate within plant cells. Conventional osmosis hollow fiber or spiral wound membrane modules might be suitable for very small power generation applications and research and development work, but would not be efficient for use in large scale osmotic plants. First of all, a large scale osmotic process would comprise multiple cells and would require the use of hundreds of thousands, if not millions, of these relatively small conventional semipermeable membranes. Secondly, if such a massive number of conventional semipermeable membrane elements were used in a large scale osmotic process, the result would be an excessive pressure drop that would seriously impact plant efficiency and complicate plant operation and cost of maintenance.

More efficient semipermeable membrane elements are needed for use in designing large scale osmosis plants.

BRIEF SUMMARY

In one embodiment, the application provides a membrane element comprising:
a hollow fiber (HF) stack comprising a plurality of loosely packed hollow fibers (HFs) comprising first ends extending through one contact structure and opposed ends extending through an opposed contact structure, each HF comprising an elongated lumen extending between the one contact structure and the opposed contact structure and comprising a hydrophilic semipermeable membrane adapted to achieve salt rejection of 98.5% or more and exhibiting a surface tension of 35 dynes/cm or more;
the membrane element being adapted to be encased in a frame and submersed in a first fluid and for induced osmosis between lumens of the plurality of loosely packed HFs and the first fluid, the membrane element having sufficient mechanical integrity when encased in the frame and submersed in the first fluid to sustain turbulence flow across and along surfaces of the plurality of loosely packed HFs at a Reynolds' Number of about 3,000 or more and to maintain said mechanical integrity at feed pumping pressures of 30 bars or higher.

In one embodiment, the application provides a membrane element comprising:
an array comprising a plurality of pairs of hollow fiber panels comprising a rectangular frame comprising one pair of opposed edges comprising a header and an opposed header defining opposed parallel edges of the rectangular frame, the header and opposed header having a longitudinal axis and comprising a fluid conduit therethrough along the longitudinal axis, wherein respective ends of the header and the opposed header mechanically communicate with respective ends of a support and an opposed support to form another pair of opposed parallel edges of the rectangular frame oriented substantially perpendicular to the one pair of opposed parallel edges, thereby forming the rectangular frame;
the hollow fiber panels comprising the membrane element comprising a hollow fiber (HF) stack comprising a plurality of loosely packed hollow fibers (HFs) comprising first ends extending through one contact structure and opposed ends extending through an opposed contact structure, each HF comprising an elongated lumen extending between the one contact structure and the opposed contact structure, wherein the first ends of the plurality of loosely packed HFs fluidly communicate with the fluid conduit through the header and the opposed ends of the plurality of loosely packed HFs fluidly communicate with the fluid conduit through the opposed header;
the hydrophilic semipermeable membranes being adapted to achieve salt rejection of 98.5% or more and exhibiting a surface tension of 35 dynes/cm or more;
the hollow fiber panels being adapted to be submersed in a first fluid and to retain in said first fluid the plurality of loosely packed hollow fibers and to maintain: (a) osmotic communication between lumens of the plurality of hollow fibers and the first fluid; (b) fluid communication of a second fluid between the lumens of the plurality of hollow fibers and any adjacent panels; and (c) turbulence flow across and along surfaces of the hollow fiber membranes at a Reynolds Number of 3,000 or more;
the plurality of loosely packed hollow fibers in one hollow fiber panel in the pair being oriented perpendicular to the plurality of hollow fibers of the other hollow fiber panel in the pair.

In one embodiment, the application provides a method of making a membrane element comprising:
a. providing a plurality of detachable spacer structures having given dimensions;
b. placing one or more first spacer structures on an HF assembly platform;
c. extending a first row of first HFs with first spaces therebetween over the one or more first spacer structures aligned with the longitudinal axis of the HF assembly platform, forming a first longitudinal row of first HFs, the first spaces having a width effective according to flow dynamic calculations to maintain turbulence flow across and along surfaces of the hollow fiber membranes at a Reynolds Number of 3,000 or more;

d. placing one or more second spacer structures having the given dimensions over the first row of HFs aligned with the one or more first spacer structures;

e. extending an adjacent row of HFs with second spaces therebetween across the one or more second spacer structures aligned with the longitudinal axis of the HF assembly platform;

f. repeating (d)-(e) with additional rows of HFs and spacer structures, forming a stack of alternating rows of HFs and intervening spacer structures, the stack having a desired height, wherein vertically aligned adjacent surfaces of the stacked spacer structures define potting chambers at opposed ends of the HFs, the potting chambers defining an inner surface having predetermined dimensions.

BRIEF DESCRIPTION OF THE DRAWINGS

The application will be better understood with reference to the drawings. Where possible, like elements contain like numerals:

FIG. 1A is a perspective view of an individual hollow fiber.

FIG. 3 is a perspective view of an array for use in a power train, the array comprising a plurality of alternating perpendicularly oriented pairs of panels.

FIG. 3A-1 is a frontal view of a vertical fiber panel in a power train.

FIG. 3A-2 is a side view illustrating fluid flow across the array of FIG. 3A-1.

FIG. 4 is a cross section through a plurality of conventionally packed hollow fibers.

FIG. 5 is a cross section through of a plurality of loosely packed hollow fibers.

FIG. 6 is a frontal view of a rectangular vessel at a vertical panel, the rectangular vessel being adapted for use with high pressures inside of the hollow fibers and low pressures outside of the hollow fibers.

FIG. 7 is a cross section through a cylindrical vessel at a vertical panel, the cylindrical vessel being adapted for use with low pressures inside of the hollow fibers and high pressures outside of the hollow fibers.

FIG. 8 is a cross section through a contact structure adapted to retain opposed ends of the HFs taken at line A-A' in FIG. 19A.

FIG. 8A is a cross section of a HF indicating an inner and outer diameter.

FIG. 10 is a perspective view of an assembly for manufacturing the membrane element.

FIG. 11 is a cross section through the assembly of FIG. 10 with only two HFs, depicting the HFs as weighted.

FIG. 14 is a cross section through an assembly comprising spacers adapted to form a potting structure, minus HF roll or loom heddle.

FIG. 15 is a top view of one embodiment of a spacer.

DEFINITIONS

Figure 3A:
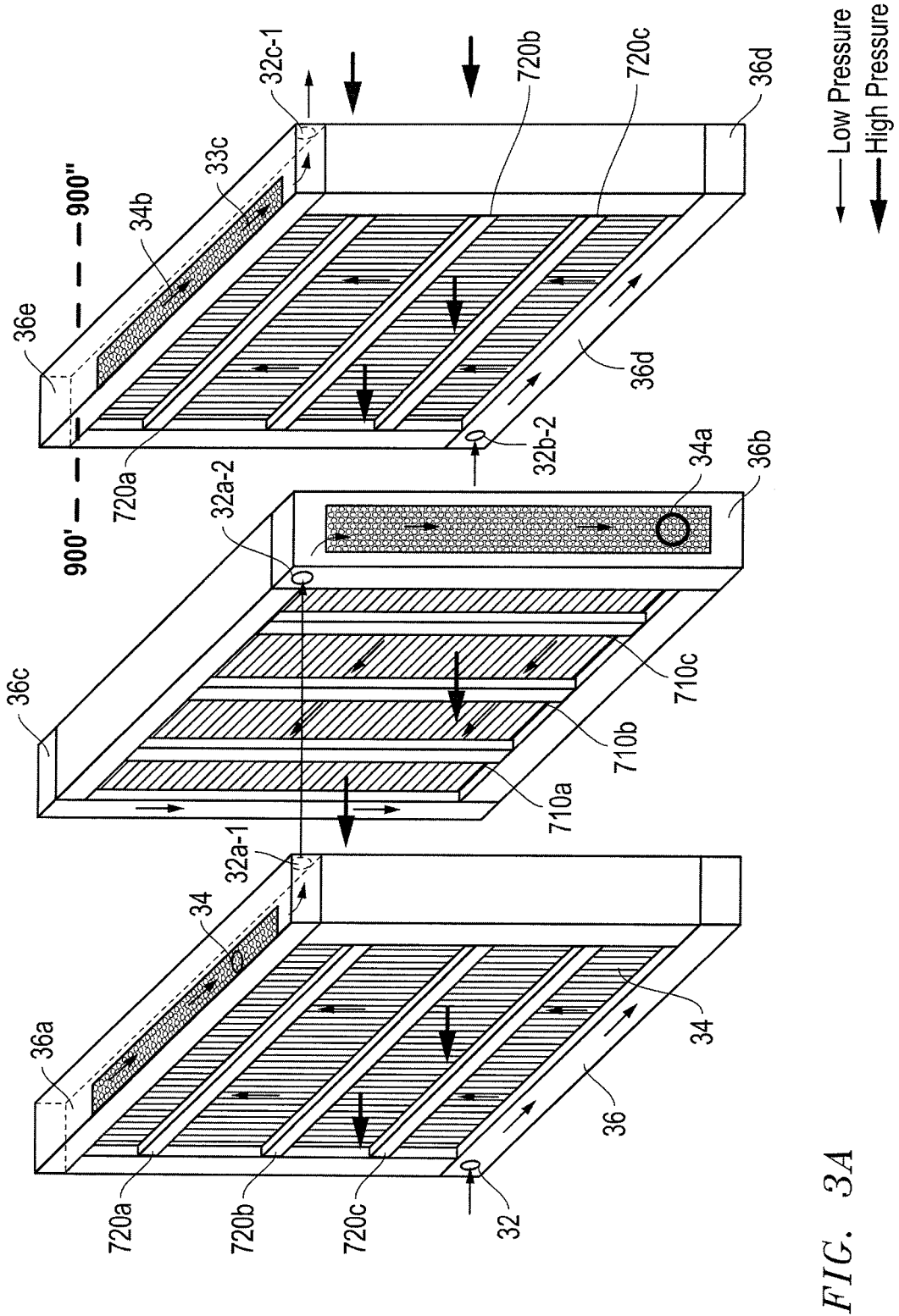
FIG. 3A is an exploded view of panels from the array of FIG. 3.

"Osmosis": The spontaneous movement of water, through a semipermeable membrane that is permeable to water but impermeable to solute, the water moving from a solution in which solute is less concentrated to a solution in which solute is more concentrated.

"Driving force": The difference in chemical potential on the two sides of a semipermeable membrane is the driving force of flow movement during osmosis. Water moves from a region of higher potential (generally a lower solute concentration) to the region of lower potential (generally higher solute concentration).

"Chemical potential": The energy potential associated with the activity of ions of an ionizable substance. The chemical potential is equal to the rate of change of free energy, known as Gibbs free energy, in a system containing a number of moles of such substance, when all other system parameters; temperature, pressure and other components are held constant. Like other kinds of potential (electrical, gravitational, momentum, magnetic, surface tension, etc.), chemical potential is spontaneous energy that flows in a direction from high to low.

"Spontaneous diffusion": Chemical potential is an intensive property of a substance in a phase. The difference in chemical potential of a substance in two adjacent phases separated by a semipermeable membrane determines whether and/or in which direction the substance will spontaneously diffuse through the semipermeable membrane. When the components of a mixture have the same chemical potential, there is no driving force and no mutual diffusion will occur.

"Osmotic pressure": In order to prevent water from moving across a semipermeable membrane, a pressure must be imposed to equalize the force created by a given difference in the chemical potential of the solution across said membrane. This force is named osmotic pressure.

"Reverse Osmosis": If an imposed pressure exceeds the osmotic pressure, then water will flow from a region of higher solute concentration to a region of lower solute concentration in a process called Reverse Osmosis. In this case, the driving force is called reverse osmosis pressure.

"Induced osmosis": Applications described herein that use the power of osmosis to perform a variety of functions for the benefit of mankind.

"Symbiosis": A mutual relationship of cyclic reverberation, without altering or modifying any of the specific components of the involved systems. Symbiosis is used to optimize industrial applications by using a waste or less valuable byproduct in one industry as a resource for use in one or more other industries.

"Induced Symbiotic Osmosis" or "ISO": spontaneously inducing continuous transient flow of permeated water through a power train comprising a plurality of fluidic loops of fixed volumetric capacity and solute concentration, bounded by semipermeable membranes, the continuous transient flow of permeated water from a low salinity water source, under the influence of an osmotic gradient to capture the kinetic potential of said transient flow within each loop, without influencing the content of said loop, the transient flow (hereafter sometimes referred to as a "Tie-Line") being continuous and at a constant flow rate throughout adjacent fluidic loops forming the power train.

"Large Scale Renewable Energy (LSRE) system": a system that generates electric power of about 25,000 kWh or more, or provides electric power to a community of about 25,000 people or more.

"Tie-Line": Water permeates by induced osmosis into the HFs at a specified permeate rate. In one embodiment, the specified permeate rate is constant throughout all the cells of a given power train. In one embodiment, the water has essentially the same purity throughout the tie-line. The direction in which the tie-line flows, and the specified permeate rate, will vary depending upon a variety of factors including but not necessarily limited to the internal HF and external HF pressure and the salinity of the respective process fluid and feed. The tie-line may have a specified permeate rate that is several times that of the feed without adversely impacting HF integrity. In some embodiments, the tie-line is assumed to have a permeate rate of a unit of volume per second, i.e. $m^3/s$ or $L^3/s$. The water permeate has as high a purity as possible. The purity of the water permeate will depend, at least in part, on the semipermeable membrane used. In one embodiment, the "water" permeate has a salinity of 1.5% or less. In one embodiment, the "water" permeate has a salinity of 1.5% or less; 1.4% or less; 1.3% or less; 1.2% or less; 1.1% or less; 1% or less; 0.5% or less; 0.4% or less; 0.3% or less; 0.2% or less; 0.1% or less. In one embodiment, the water permeate is 100% pure water.

The foregoing definitions are not exhaustive, and additional definitions may be found in the following detailed description.

DETAILED DESCRIPTION

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In one embodiment, the application provides apparati and processes of making same, for efficiently exchanging low or no solute solutions with high or hypersolute aqueous solutions. In one embodiment, the low or no solute solutions are saline solutions. The apparati may be used in a large variety of processes, including but not necessarily limited to water micro filtration, ultra filtration, nanofiltration purification (reverse osmosis), extraction, salinity power generation and gas mixture separation (landfill gases as an example), and combinations thereof.

The Membrane Element

Hollow fibers are generally more economical than other types of membrane design. Hollow fibers have the advantage of allowing for a large membrane area per unit volume. Accordingly, hollow fiber systems may be relatively compact systems.

Figure 19B:
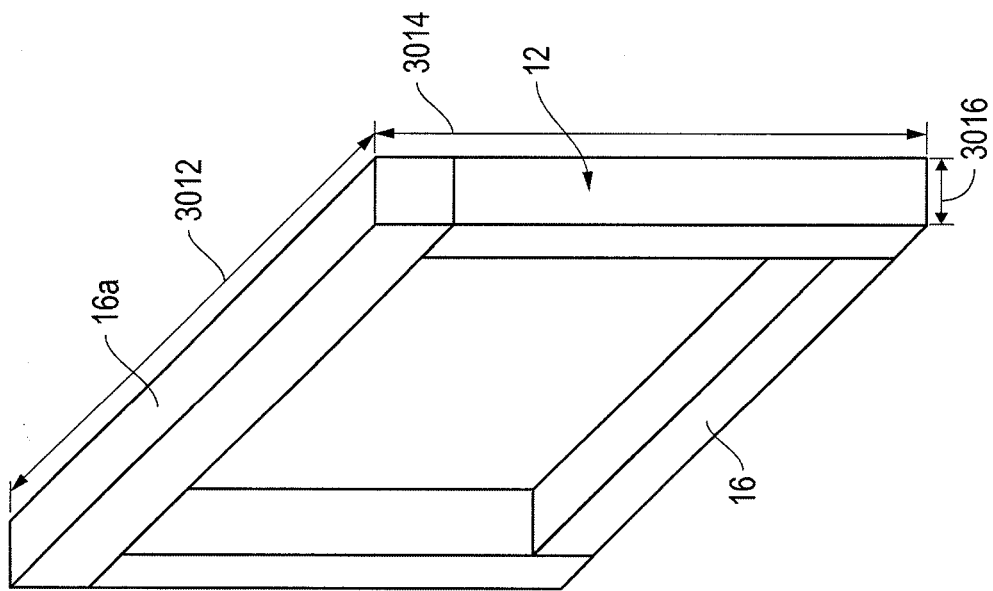
FIG. 19A and FIG. 19B, together, are an exploded view of a membrane element separated from a frame of one embodiment of a hollow fiber panel.
Figure 19A:
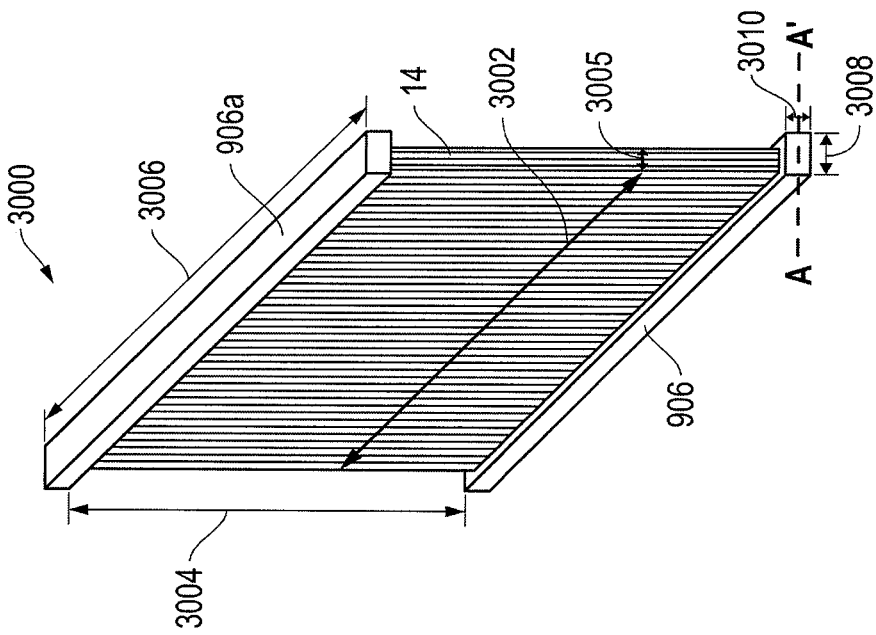

In one embodiment, referring to FIG. 19A, the application provides a membrane element 3000 comprising: a hollow fiber (HF) stack comprising a plurality of loosely packed hollow fibers (HFs) 14 comprising first ends extending through one contact structure 906 and opposed ends extending through an opposed contact structure 906a, each HF comprising an elongated lumen extending between the one contact structure 906 and the opposed contact structure 906a and comprising a hydrophilic semipermeable membrane adapted to achieve salt rejection of 98.5% or more and exhibiting a surface tension of 35 dynes/cm or more. The membrane element 3000 is adapted to be encased in a frame 12 for a HF panel 10 of FIG. 1. The plurality of loosely packed HFs 14 are adapted to be submersed in a first fluid and to sustain turbulence flow across and along surfaces of the plurality of loosely packed HFs 14 at a Reynolds' Number of about 3000 or more.

Hollow Fiber Panel

Figures 2, 3A:
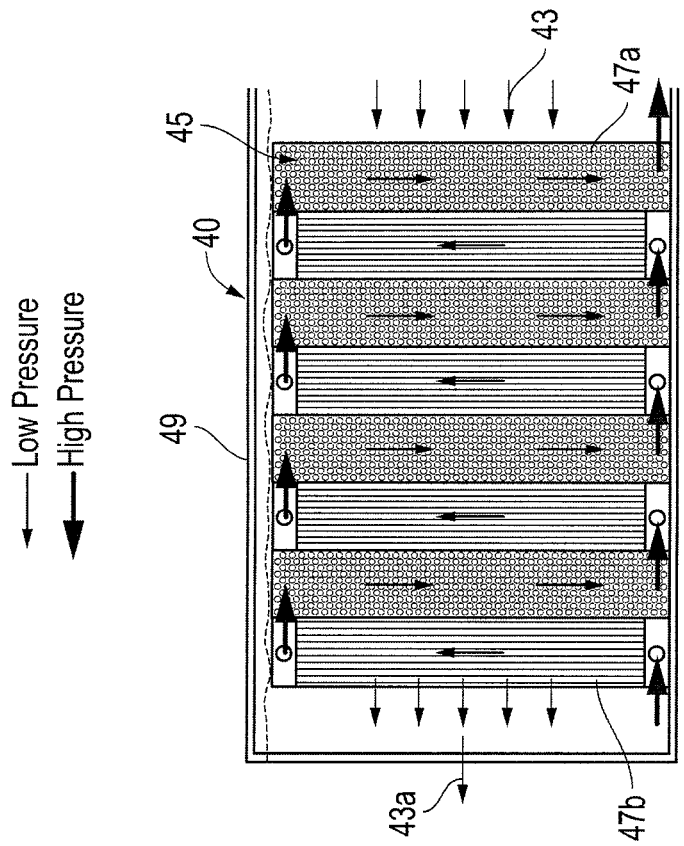
FIG. 2 is perspective view of a pair of panels comprising perpendicularly oriented hollow fibers.
Figures 1, 3A:
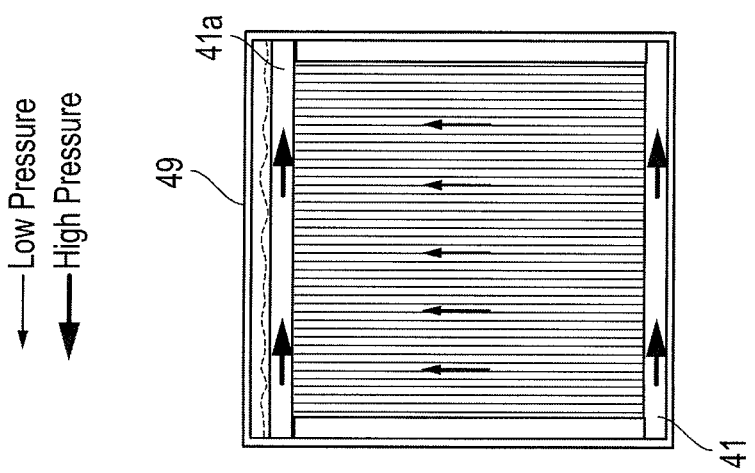
FIG. 1 is a cross section through a plurality of vertical hollow fibers and one support member of a panel.

In one embodiment, referring to FIG. 1, the HF panel 10 comprises: a frame 12 comprising a header 16, an opposed header 16*a*, and the membrane element 3000 (FIG. 19A, described above) retained within the frame 12. The membrane element 3000 (FIG. 19A) comprising the plurality of loosely packed HFs 14 engaged at each end by the first and second contact structure (906, 906*a*, FIG. 19A) is adapted to provide fluid communication between lumens of the plurality of loosely packed HFs 14, the header 16, the opposed header 16*a*, and any adjacent frames and panels. The HF panel 10 is adapted for submersion in a first fluid and for induced osmosis between lumens of the plurality of loosely packed HFs 14 in the membrane element 3000 (FIG. 16, FIG. 19) and the first fluid. The HF panel 10 has sufficient mechanical integrity to sustain turbulence flow across and along surfaces of the plurality of loosely packed HFs 14 at the Reynolds' Number of about 3,000 or more and to maintain said mechanical integrity at feed pumping pressures of 30 bars or higher.

In one embodiment, the frame 12 may have a variety of shapes (in frontal view) including, but not necessarily limited to circular, elliptical, triangular, and rectangular. In the embodiment shown in FIG. 1, the frame 12 is square (in frontal view) and comprises a first header 16 and an opposed header 16*a*, and a first support 19 and second support 19*a*. In one embodiment, one or both of the first header 16 and the opposed header 16*a* have a depth 18.

The plurality of HFs 14 comprise a plurality of loosely packed individual HFs 1 (FIG. 1A) comprising a semipermeable membrane defining a lumen. In one embodiment, the semipermeable membrane is adapted to retain its mechanical integrity at higher feed pumping pressures across the lumens and higher process fluid pressures inside of the lumens compared to low pressure microfiltration and ultra-filtration HF membranes currently in use in the industry.

The actual feed pressure to which the HF panel 10 comprising the HF membrane element 3000 (FIG. 19A) will be exposed will differ depending upon the process being performed, the initial salinity of the process fluid and the feed, and the tie-line flow. Induced osmosis of water having salinity of 1% generates an osmotic head equivalent to 7.75 bars. At 6% salinity, the osmotic head is equivalent to 46.5 bars. In general, the sustainable feed pumping pressure must be sufficiently high to overcome this osmotic head. For example, in the case of desalination of seawater (3.5% salinity) by reverse osmosis, where concentrated brine leaves at 6% salinity and produces an osmotic pressure of 46.5 bars, the sustainable feed pumping pressure must be higher than the osmotic head of 6%.

In one embodiment, the semipermeable membrane maintains mechanical integrity at a feed pressure of: 30 bars or higher, 31 bars or higher; 32 bars or higher; 33 bars or higher; 34 bars or higher; 35 bars or higher; 36 bars or higher; 37 bars or higher; 38 bars or higher; 39 bars or higher; 40 bars or higher; 41 bars or higher; 42 bars or higher; 43 bars or higher; 44 bars or higher; 45 bars or higher; 46 bars or higher; 47 bars or higher; 48 bars or higher; 49 bars or higher; or, 50 bars or higher.

In one embodiment, the semipermeable membrane material "rejects" solute, or does not permit solute in a solution to pass through the membrane. In one embodiment, the solute is salt, and the semipermeable membrane material rejects salt. In one embodiment, the salt is primarily sodium chloride.

The higher the effective solute rejection, the more efficient the operation of the membrane. In one embodiment, the semipermeable membrane is effective to reject 98.5% or more of the solute in the feed. In one embodiment, the semipermeable membrane is effective to reject 98.5% or more salt in a feed. In one embodiment, the semipermeable membrane is effective to reject the following percent of salt in the feed: 98.1%; 98.2%; 98.3%; 98.4%; 98.5%; 98.6%; 98.7%; 98.8%; 98.9%; 99%; 99.1%; 99.2%; 99.3%; 99.4%; 99.5%; 99.6%; 99.7%; 99.8%; 99.9%; about 100%.

The selection of suitable semipermeable membrane(s) for a particular process should be based on performance and economics in the particular process. Suitable membranes include, but are not necessarily limited to stirred cell membranes, flat sheet tangential flow membranes, tubular membranes, capillary membranes, spiral-wound membranes, hollow fiber membranes, other high operating pressure semipermeable membranes in the form of small bore cylinders, and combinations thereof.

The membrane processing technologies of microfiltration (MF), ultrafiltration (UF), nanofiltration (NF) and reverse osmosis (RO) are widely used to separate suspended and dissolved materials from water solutions in numerous industrial, medical and drinking water applications. MF typically is used to separate or remove suspended or colloidal particulates having a maximum diameter of from about 0.1 to about 1.0 microns (about 1,000 to about 10,000 angstroms). UF typically is used to separate or remove dissolved materials depending upon solute size, which typically comprises a maximum diameter of from about 0.001 microns to about 0.1 microns (about 10 angstroms to about 1,000 angstroms). NF and RO typically are used for to separate or remove materials having a maximum diameter of less than about 0.001 micron (about 10 angstroms).

Common membrane materials include polyamide thin film composites (TFC), polysulfone, polypropylene, cellulose acetate (CA), cellulose triacetate (CTA) and others. For commercial large RO systems, spiral wound and hollow fibers membranes are the primary candidates. Suitable membrane materials are hydrophilic.

Existing technologies suffer from what is known as concentration polarization phenomenon. The use of hydrophilic semipermeable membranes in hollow fiber panels significantly mitigates this phenomenon. Hydrophilic literally means "water-loving." Accordingly, a hydrophilic material exhibits an affinity for water, and tends to readily adsorb water.

Suitable hydrophilic semipermeable membranes have a surface tension sufficiently high to maintain materials at the surface of the semipermeable membrane in liquid form. In one embodiment, the surface tension of the hydrophilic semipermeable membrane is about 35 dyne/cm or more. In one embodiment, the surface tension is about 36 dyne/cm or more; 37 dyne/cm or more; 38 dyne/cm or more; 39 dyne/cm or more; 40 dyne/cm or more. In one embodiment, the surface tension of the hydrophilic semipermeable membrane is from about 40 to about 45 dyne/cm. In one embodiment, the surface tension of the hydrophilic semipermeable membrane is about 41 dyne/com; 42 dyne/cm; 43 dyne/cm; 44 dyne/cm; or 45; dyne/cm. In one embodiment, the hydrophilic semipermeable membrane material has a surface tension of about 44 dyne per centimeter or more.

Hydrophilic membrane materials having suitable surface tensions include, for examples, Polyepichlorohydrin (surface tension-35), Polyvinyl Chloride (PVC) (surface tension-39), Polysulfone (surface tension-41), Polyethylene Terephthalate (Polyester) (surface tension-43), Polyacrylonitrile (surface tension-44); Cellulose (surface tension-44), and variants thereof.

In one embodiment, the hydrophilic semipermeable membrane material is cellulose acetate. Cellulose acetate has a surface tension of 44 dyne per centimeter (dyne/cm). In one embodiment, the hydrophilic semipermeable membrane is a cellulose triacetate (CTA) membrane. A suitable CTA semipermeable membrane is commercially available from the Japanese corporation, Toyobo Co, Ltd.

The individual HFs 1 of FIG. 1A have a first end 13, an opposed end 13*a*, and a length 2 of semipermeable membrane defining a lumen. The HFs define a lumen having a variety of shapes including, but not necessarily limited to tubular, elliptical, triangular, and rectangular. In one embodiment, the HFs 1 are tubular. A person of ordinary skill in the art will recognize that the components of the present application may have a variety of sizes. The lumen diameter may vary. In one embodiment, the lumen diameter is from about 50 micrometer to about 2000 micrometer (2 mm).

The plurality of HFs 14 has a "loosely packed" configuration. FIG. 4 is a cross section through a HF bundle having a conventional tightly packed configuration. As seen in FIG. 4, in a tightly packed conventional configuration, the walls (1*a*-1*e*) of adjacent HFs either touch or have boundary layers that are so close that they form stagnation areas 52, 52*a* between which fluid cannot freely flow. These stagnation areas 52, 52*a* tend to negatively impact the efficiency of the osmotic processes using the HF bundle. FIG. 5 is a cross section through a plurality of HF's 14 of the present application, which are loosely packed. As seen in FIG. 5, the walls 5*a*-5*e* of adjacent HFs do not touch, or are sufficiently spaced to avoid forming stagnation areas between the HFs. This tends to prevent stagnation and improve the efficiency of the osmotic process performed using the plurality of HFs. This also tends to reduce the potential to form concentration polarization sites.

Figure 3B:
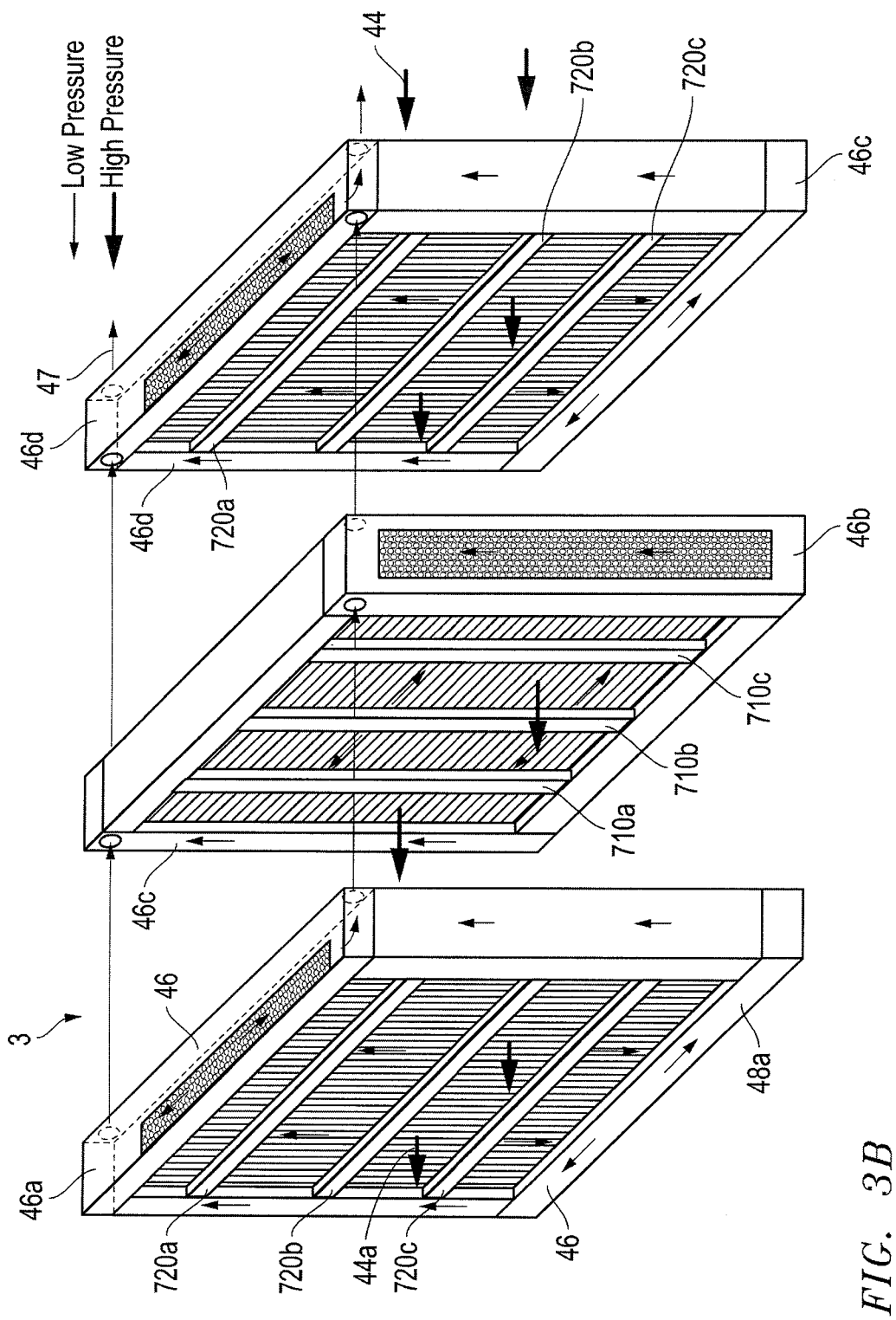
FIG. 3B is an exploded view of panels from a desalination array.
Figure 3C:
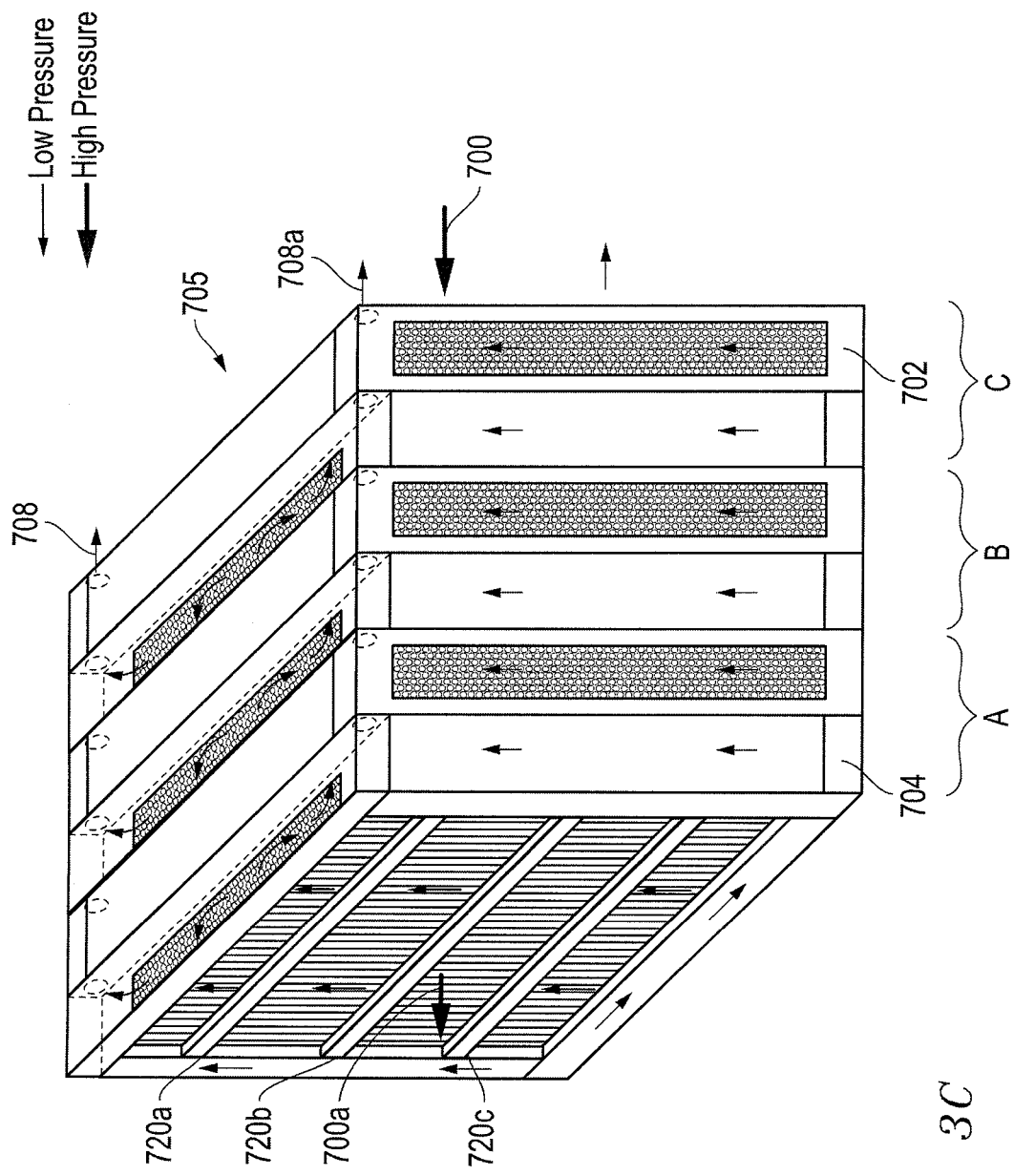
FIG. 3C is a perspective view of a desalination array.
Figure 3D:
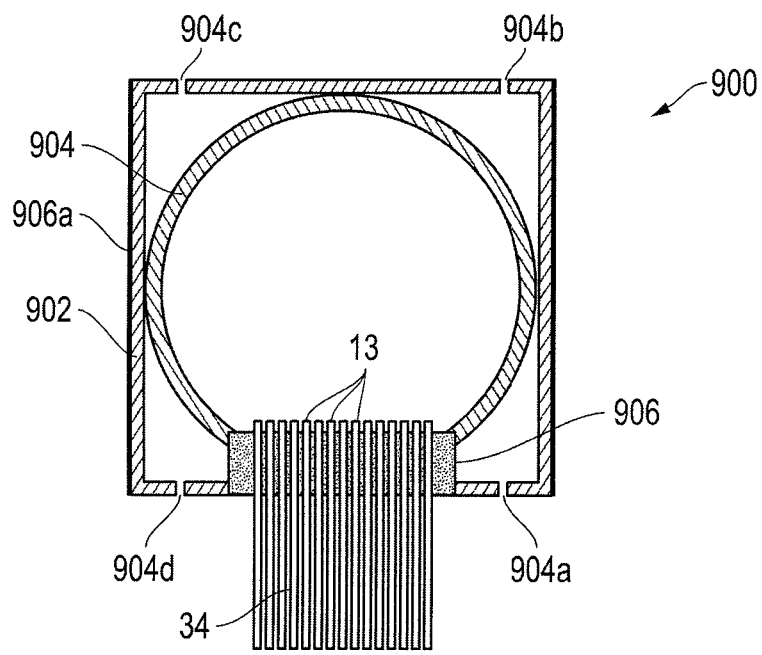
FIG. 3D is a cross-section of a fiber reinforced plastic (FRP) frame for a hollow fiber panel.
Figure 3E:
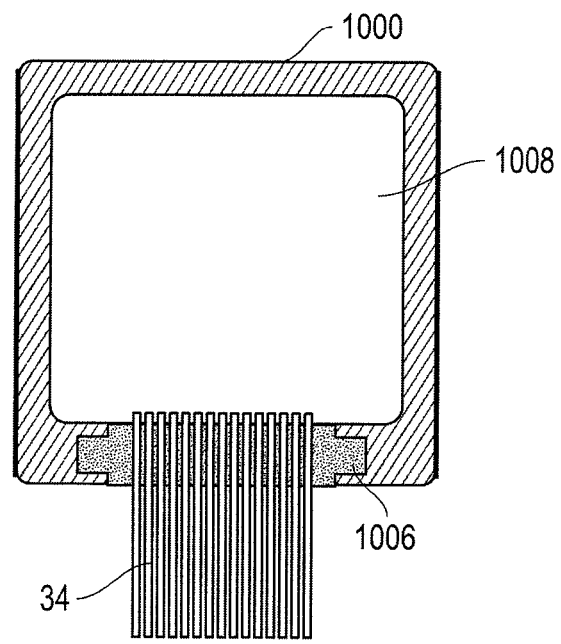
FIG. 3E is a cross-section of a steel frame or FRP for a hollow fiber panel
Figure 3F:
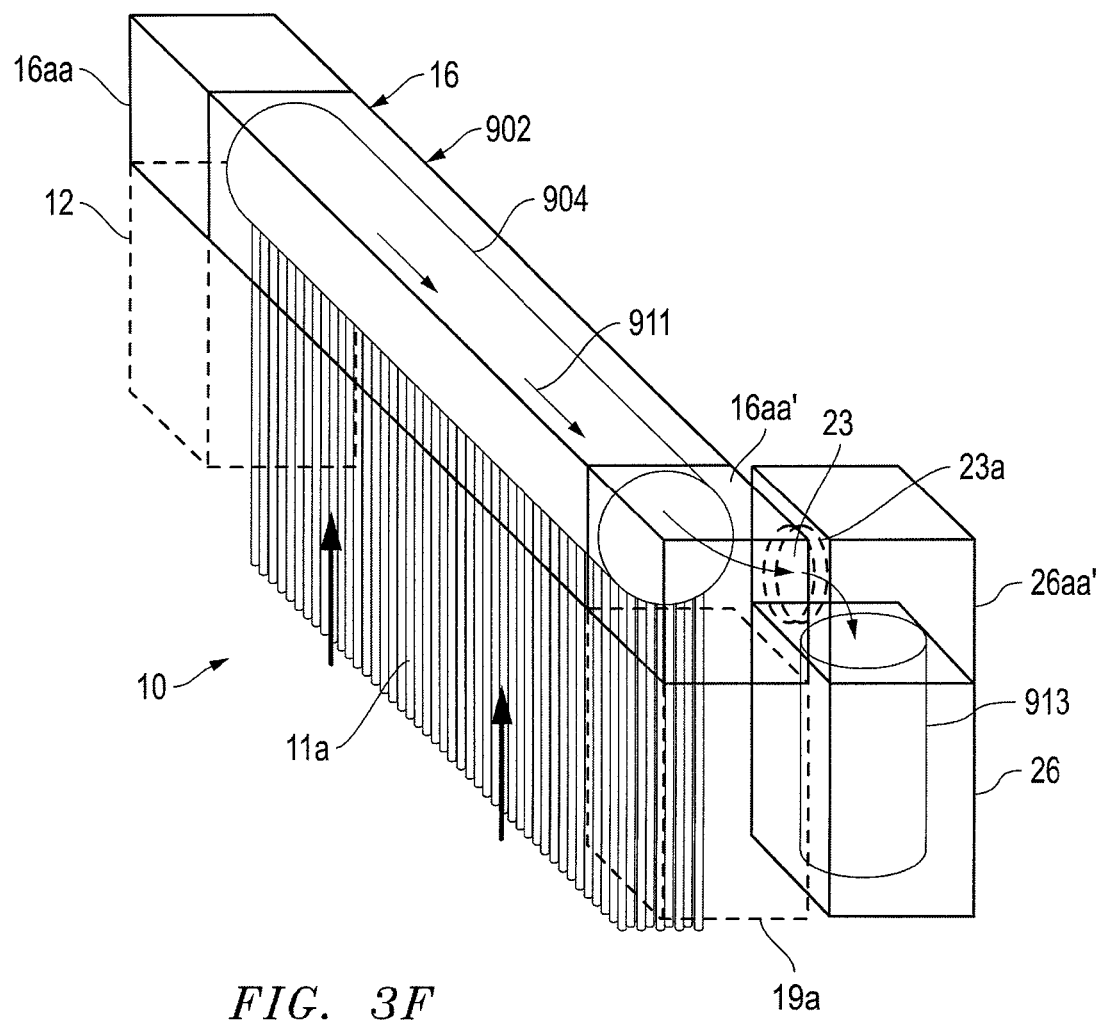
FIG. 3F is a cutaway/transparent frame perspective view of a panel 12 (FIG. 2) comprising the header 16 and an adjacent header 26 (FIG. 2).
Figure 3G:
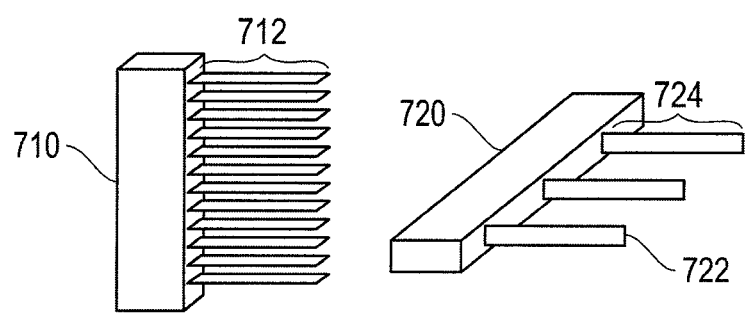
FIG. 3G is a perspective view of a vertical baffle and a horizontal baffle.

In one embodiment, referring to FIG. 3G, the plurality of HFs 14 in each frame are retained in a loosely packed configuration by one or more horizontal baffles 720 and/or one or more vertical baffles 710. In one embodiment, the plurality of HFs 14 in each frame are retained in a loosely packed configuration by a plurality of spaced horizontal baffles 720 and/or vertical baffles 710. The baffles may be external baffles which are removable from the HF frame 12, or the baffles may be integrated into the HF frame 12, as described more fully below.

The external baffles may have a variety of constructions. In one embodiment, each baffle comprises a backing with suitable retainers extending therefrom, as depicted in FIG. 3G. In one embodiment, the baffle is a vertical baffle comprising backing 710. In one embodiment, the baffle is a horizontal baffle comprising backing 720. In one embodiment, the retainers are spikes. In one embodiment, the retainers are wire loops. Spaced wire loop baffles are useful to avoid damaging the plurality of HFs. The size of the backing 710, 720 will vary with the size of the panel. The spikes or wire loops 712, 722 have a length 714, 724 sufficient to extend through and inhibit movement of the plurality of HFs. In one embodiment, the baffles 710, 720 and the extensions 710, 712 are in fixed communication with the frame. In one embodiment, the baffles are bolted to the frame.

In one embodiment, once positioned in a given system, the HFs in a frame run vertically and the panel comprises one or more horizontal baffles 720. Referring to FIG. 3G, each horizontal baffle comprises backing 720 comprising a plurality of appropriately spaced wire loops 722. The spikes or wire loops 722 are spaced along the backing 720 at intervals effective to retain the plurality of HFs running vertically in a loosely packed configuration and to prevent sagging when the spikes or wire loops 722 are inserted through the plurality of HFs. The intervals between spikes or wire loops 722 may vary. In one embodiment, the spikes or wire loops 722 in a horizontal baffle are spaced at larger intervals than in a vertical baffle. In one embodiment, the spikes or wire loops 722 in a horizontal baffle are spaced from about 6 to 12 inches apart. Once inserted through the plurality of HFs, the spikes or wire loops 722 reduce movement of the plurality of HFs. In one embodiment, the horizontal baffles 720 are spaced apart across the plurality of HFs. The space between the horizontal baffles 720 is effective to retain the plurality of HFs running vertically in a loosely packed configuration and to prevent sagging. In one embodiment, the space between horizontal baffles 720 is from about 20 cm to about 30 cm.

In one embodiment, the HFs in the frame run horizontally and the panel comprises one or more vertical baffles 710. Referring to FIG. 3G, each vertical baffle comprises backing 710 comprising a plurality of appropriately spaced wire loops 712. The spikes or wire loops 712 are spaced along the backing 710 at intervals that are effective to retain the plurality of HFs running horizontally in a loosely packed configuration and to prevent sagging when the spikes or wire loops 712 are inserted through the plurality of HFs. The intervals between spikes or wire loops 712 may vary. In one embodiment, the spikes or wire loops 712 in a vertical baffle are spaced at smaller intervals than in a horizontal baffle. In one embodiment, the spikes or wire loops 712 in a vertical baffle are spaced from about 1 to 2 inches apart. Once inserted through the plurality of HFs, the spikes or wire loops 712 reduce movement of the plurality of HFs. In one embodiment, the vertical baffles 710 are spaced apart across the plurality of HFs. The space between the vertical baffles 710 is effective to retain the plurality of HFs running horizontally in a loosely packed configuration and to prevent sagging. In one embodiment, the space between vertical baffles 710 is from about 20 cm to about 30 cm.

The backing 710, 720 may be made of a variety of materials, including but not necessarily limited to metal, plastic, and combinations thereof. In one embodiment, the backings 710, 720 are made of polypropylene. In one embodiment, the backings 710, 720 are made of fiber reinforced plastic. The spikes or wire loops may be made of any suitable material, including but not necessarily limited to metal and plastic. In one embodiment, the spikes or wire loops comprise steel. In one embodiment, the spikes or wire loops are coated with a suitable corrosion protection material. Substantially any corrosion protection material may be used. In one embodiment, the corrosion protection material is Teflon. In one embodiment, the corrosion protection material is epoxy.

The frame is adapted to permit (a) induced osmosis between lumens of the plurality of hollow fibers and a surrounding environment and (b) fluid communication between the lumens of the plurality of hollow fibers and any adjacent panels. Referring to FIG. 1, in one embodiment, the plurality of HFs 14 are loosely packed substantially parallel to one another to form a first edge 11 and an opposed edge 11*a*. In one embodiment, the first edge 11 abuts the support member 19 and the opposed edge 11*a* abuts the opposing support member 19*a*.

In one embodiment, first ends 13 of the plurality of HFs 14 fluidly communicate with a first header 16. In one embodiment, the opposed ends 13*a* of the plurality of HFs 14 fluidly communicate with an opposed header 16*a* (not shown).

Referring to FIG. 19A, the stack of loosely packed HFs 14 (the HF stack) in the membrane element 3000 has a width 3002, a height 3004, and a depth 3005. In one embodiment, the HF stack width 3002 is the same as the HF stack height 3004. In one embodiment, the HF stack width 3002 is about 3 meters. In one embodiment, the HF stack has a depth 3005 of from 40 to about 80 mm.

The contact structures 906, 906a (or 1006 in FIG. 3E) at each end of the loosely packed HFs 14 have a length 3006, a width 3008, and a thickness 3010. In one embodiment, the contact structure length 3006 is slightly larger than the HF stack width 3002, and the contact structure width 3008 is slightly larger than the HF stack depth 3005 to allow for proper support of the HF stack 14 on the frame of FIG. 19B. In one embodiment, the HF stack depth 3005 is 40-80 mm. In one embodiment, the HF stack depth 3005 is about ¾ of the contact structure width 3008. In one embodiment, the contact structure thickness 3010 is from about 20 to 60 mm, depending on operating pressure.

The frame 12 has a header 16 and an opposed header 16a. The frame has a frame width 3012, a frame height 3014, and a frame depth 3016. In one embodiment, the frame width 3012 is the same as the frame height 3014. In one embodiment, the frame depth 3016 is from about 1.5-2 times the contact structure width 3008 for proper support of the membrane element 3000.

Referring to FIG. 2, the HF panel 10 abuts an adjacent HF panel 20 having a similar structure to HF panel 10. The adjacent HF panel 20 comprises a plurality of hollow fibers 24. The adjacent HF panel 20 in FIG. 2 has a square frame comprising a first header 26 and an opposed header 26a, a first support 29 and an opposed support (not shown). In one embodiment, the lengths 2 (FIG. 1A) of the plurality of hollow fibers 24 in the adjacent HF panel 20 are at an angle relative to the lengths 2 (FIG. 1A) of the plurality of hollow fibers 14 in the HF panel 10. In FIG. 2, the lengths 2 (FIG. 1A) of the plurality of hollow fibers 24 in the HF panel 20 are oriented substantially perpendicular to the lengths 2 (FIG. 1A) of the plurality of hollow fibers 14 in the HF panel 10. In this embodiment: the opposed header 16a of the HF panel 10 abuts the first support member 29 of the adjacent HF panel 20; the header 16 of the HF panel 10 abuts the opposed support member (not shown) of the adjacent HF panel 20; the support member 19 of the HF panel 10 abuts the first header 26 of the adjacent HF panel 20; and the support member 19a abuts the opposed header 26a of the adjacent HF panel 20.

In one embodiment, header 16 comprises a first aperture 22 adjacent to support 19 and the opposed header 16a comprises an aperture 23 adjacent to opposed support 19a. The apertures 22, 23 may have a variety of shapes including, but not necessarily limited to circular, elliptical, triangular, rectangular, and combinations thereof. In one embodiment, the apertures 22, 23 are circular. In one embodiment of a power train, the aperture 22 communicates with a source of process fluid (not shown).

In one embodiment, the HFs 25 and 24 are loosely packed between the first header 16 and the opposed header 16a and 26 and 26a in FIG. 2, respectively. In one embodiment, the packing is sufficiently loose for feed to flow across the array substantially perpendicular to the HF panels at a given flow rate and feed capacity without stagnation, but sufficiently tight to provide the desired processing capacity. The frame 12 of the HF panel 10 comprises the headers 16, 16a and the supports 19, 19a, the frame of adjacent HF panel 20 comprises the headers, 26, 26a and the support 29 (and the opposed support, not shown).

The headers and supports comprise a material and structure having sufficient mechanical integrity to retain the plurality of HFs 14, 24 when exposed to a substantially perpendicular flow of feed at a specified operating pressure. The frame 12, as well as other components, such as the array casing, may be made of a variety of materials including, but not necessarily limited to fiber reinforced plastic (FRP). Fiber-reinforced plastic (FRP) (also sometimes called fiber-reinforced polymer) is a composite material made of a polymer matrix reinforced with fibers. Common fibers include, but are not necessarily limited to glass, carbon, basalt, aramid, paper, wood, asbestos, and the like. In one embodiment, the fibers are selected from the group consisting of glass, carbon, basalt, aramid, and combinations thereof. Common polymers include, but are not necessarily limited to thermosetting plastics selected from the group consisting of epoxy, vinyl ester, polyester, phenol-formaldehyde resins, and combinations thereof.

Suitable FRP's meet or exceed the mechanical properties of steel. In one embodiment, the FRP exhibits superior thermo-mechanical properties, is light weight, is relatively low cost, exhibits corrosion resistance, and is easy to maintain. In one embodiment, headers and supports are made of the same material. In one embodiment, the headers and supports are made of different materials. In one embodiment, the headers and/or supports are made of steel (FIG. 3E). In one embodiment, the headers and/or supports are made of FRP. In one embodiment, the headers and the supports are made of FRP.

The membrane element and HF panel are useful in a variety of ISO apparati and processes. Suitable ISO apparati and processes include, but are not necessarily limited to those for ISO power generation, reverse osmosis, desalination, and water extraction from diluted organic, contaminated groundwater and industrial solutions. The HF panel 10 is particularly useful to perform large scale ISO processes. In one embodiment, the process fluid 15 (or fluid inside of the HF lumen) is at a relatively high pressure and the feed (or fluid outside of the lumen) is at a relatively low pressure.

The salinity (or solute concentration) of the process fluid 15 and the feed 17 will vary. The process fluid 15 for an extraction process typically has a moderate salinity. In one embodiment, the moderate salinity is from about 3% to about 7%. The process fluid 15 for osmotic power generation and/or seawater desalination by reverse osmosis will have a low salinity, typically less than about 3%. In one embodiment, the process fluid 15 is at a relatively low pressure and the initial feed is at a relatively high pressure. In one embodiment, the process fluid is at a relatively low pressure of from about 3 bars to about 5 bars and the feed is at a relatively high pressure of from about 10 bars to about 60 bars or more, depending of on feed salinity. In one embodiment, the conditions are optimized to produce a tie-line, as defined herein and more fully described in ISO U.S. Pat. No. 8,545,701, having a flow rate that varies from less than 1 liter/sec to a flow rate of several cubic meters/sec. In one embodiment, the conditions are optimized to produce a tie-line having a flow rate of greater than 1 m$^3$/sec. In one embodiment, the tie-line has a flow rate of 3 m$^3$/sec or more. In one embodiment, the tie-line has a flow rate of than 5 m$^3$/sec or more. In one embodiment, the tie-line has a flow rate of 10 m$^3$/sec or less.

In one embodiment, the pressure differential between the process fluid within the HF lumens and the feed outside of the HF lumens, respectively, is 5 bars or more. In one embodiment, particularly in the case of treating water contaminated with radioactive material, relatively low pressure differential is used, at least initially, to avoid radioactive particles penetrating the semipermeable membrane. In one embodiment treating water contaminated with radioactive material, the operating pressures within the HF lumens and the outside of the HF lumens in an initial closed loop maintain a pressure differential of 10 bars or less in the initial closed loop. In one embodiment treating water contaminated with radioactive material, the operating pressures within the HF lumens and the outside of the HF lumens in an initial closed loop maintain a pressure differential of less than 10 bars in the initial closed loop. In one embodiment treating water contaminated with radioactive material, the operating pressures within the HF lumens and the outside of the HF lumens in a final high pressure closed loop in series maintains a pressure differential of 5 bars or higher in the final high pressure closed loop. In one embodiment, particularly when the process is ISO power generation and reverse osmosis, the pressure differential is 40 bars or more. In one embodiment, for power generation, the pressure differential is 30 bars or more.

Accordingly, depending upon the process performed, the pressure differential is: from 5 bars or more to 10 bars or less (esp. water contaminated with radioactive material); in other processes, 15 bars or more; 20 bars or more; 25 bars or more; 30 bars or more (esp. power generation); 31 bars or more; 32 bars or more; 33 bars or more; 34 bars or more; 35 bars or more; 36 bars or more; 37 bars or more; 38 bars or more; 39 bars or more; 40 bars or more (power generation and reverse osmosis); 41 bars or more; 42 bars or more; 43 bars or more; 44 bars or more; 45 bars or more; 46 bars or more; 47 bars or more; 48 bars or more; 49 bars or more; 50 bars or more; 51 bars or more; 52 bars or more; 53 bars or more; 54 bars or more; 55 bars or more; 56 bars or more; 57 bars or more; 58 bars or more; 59 bars or more; or, 60 bars or more.

The feed 17 flows substantially perpendicular to and across the HF panel 20, and the HF panel 10, producing a modified feed 17b. The modified feed 17b has a different flow rate and composition than the feed 17 caused by water spontaneously permeating from or into the HFs 14 that are stretched across the frame 12. Process fluid 15 (FIG. 1) flows through the aperture 22 and into the first header 16. The process fluid 15 flows from the first header 16 into the lumens of the plurality of HFs 14 and in a direction 13b to the opposed header 16a. Modified process fluid 21 (FIG. 1) flows through an aperture 23 out of opposed header 16a. In one embodiment, the modified process fluid 21 flows into an adjacent header 26a (FIG. 2).

Although relatively low lumen operating pressures (e.g., 3-5 bars) may not be sufficient for power generation, HF panels having such low lumen pressures may still be used to provide support functions. In one embodiment, HF panels having low lumen operating pressures are used to perform water filtration. In one embodiment, HF panels having low lumen operating pressures are used to perform ISO extraction.

In one embodiment, the process fluid is seawater. In one embodiment, the feed is brackish water or agricultural drainage. In this embodiment, water spontaneously permeates from the feed (brackish water or agricultural drainage) to the seawater in the HF lumens, diluting the seawater.

The HF stack cross section 11 of the plurality of HFs 14 in the frame 12 of FIG. 1 and the HF stack cross section 18a of the plurality of HFs 24 in the frame of HF panel 20 of FIG. 2 may vary in size according to application. In one embodiment, the HF stack cross section 11 and the HF stack cross section 18a are different. In one embodiment, the HF stack cross section 11 and the HF stack cross section 18a are the same.

Referring now to FIG. 3, a power array 30 comprises a plurality of sequentially abutting pairs (A, B, C) of HF panels. In one embodiment, spaced horizontal baffles 720a, 720b, 720c are visible on a tail panel. In this embodiment, an initial feed 37 is charged to the power array 30 at an angle substantially perpendicular to and across the respective plurality of HFs 34-34e in each panel to exit as a modified feed 37a. In one embodiment, where the initial feed is a high salinity feed, the initial feed 37 is at a pressure of from about 30 bars to about 50 bars and the process fluid 35 is at a pressure of from about 1 bar to about 5 bars.

In one embodiment, initial process fluid 35 having a relatively low salinity flows through the aperture 38 and into the header 36, from the header 36 through the plurality of HFs 34 in a direction 39a, producing a modified initial process fluid 33 that flows into an opposed header 36a from the opposed lumens. The modified initial process fluid 33 flows through an aperture 32a-1 and through an abutting aperture 32a-2 (FIG. 3A) into an adjacent header 36b, through the plurality of HFs 34a, producing a second modified process fluid (not shown) that flows into an opposed header 36c. The second modified process fluid (not shown) flows through a first aperture (not shown) and through an abutting aperture 32b-2 (FIG. 3A) into an adjacent header 36d. The second modified process fluid (not shown) flows through the plurality of HFs 34b, producing a third modified process fluid 33c that flows into the header 36e. The third modified process fluid 33c flows through an aperture 32c-1 into header 36f (FIG. 3), from header 36f through the plurality of HFs 34c into opposed header 36g, producing a fourth modified process fluid (not shown). The fourth modified process fluid (not shown) flows from header 36g through abutting apertures (not shown) into adjacent header 36h, through the plurality of HFs 34d to produce a fifth modified process fluid 33d. The fifth modified process fluid flows through aperture 32e-1 and an abutting aperture into an adjacent header 36j, through the plurality of HFs 34e, into the header 36k producing a sixth modified process fluid (not shown). In the embodiment shown in FIG. 3 the sixth modified process fluid (not shown) exits through an aperture (not shown) in the header 36k. In one embodiment, the sixth modified process fluid is collected. In one embodiment, the sixth modified process fluid 31 flows to the next array. Referring to FIG. 3A, the spaced horizontal baffles 720a, 720b, 720c and spaced vertical baffles 710a, 710b, 710c are visible on the respective panels. The baffles are described in more detail below.

FIG. 3A-1 is frontal view of a vertical fiber panel at a cross section through a rectangular array comprising a casing 49. FIG. 3A-2 is a top view of the array of FIG. 3A-1 comprising the array casing 49.

Referring to FIG. 3A-1, process fluid is introduced into the header 41 and flows through the HFs to an opposed header 41a. In one embodiment, referring to FIG. 3A-2, a high salinity brine feed 43 is charged to the array 45, and flows from and across a tail panel 47a to and across an initial panel 47b of the array 45. In one embodiment, the total area (width×length) of the frontal view across which the feed flows is up to 100 times larger than the corresponding area across which the feed flows in a conventional, commercially available tube-like high pressure membrane array. The modified feed 43a exiting the array 45 is a low salinity product, typically at a higher flow rate than the high salinity brine feed 43.

FIG. 3B depicts a typical cross flow pattern in a desalination array 3. In one embodiment, the desalination panels operate relatively independently. In one embodiment, a brine feed 44 is charged at a relatively high pressure to and across the desalination array 3. In one embodiment, the brine feed 44 is seawater. Where the brine feed 44 is seawater, the seawater 44 passes across the array and water passes from the seawater into the HFs, producing desalinated seawater 47. A relatively high salinity brine 44a exits the array. Spaced horizontal baffles 720*a*, 720*b*, 720*c* and spaced vertical baffles 710*a*, 710*b*, 710*c* are visible the respective panels. The baffles are described in more detail below.

FIG. 3C is a perspective view of desalination array 705 comprising pairs of substantially perpendicularly oriented panels (A, B, C). In one embodiment, seawater 700 is fed across the array to and across a tail panel 702 at a relatively high pressure. As the seawater 700 passes from the tail panel 702 across the array to an initial panel 704, water flows from the seawater into the lumens of the HFs, producing desalinated seawater 708. A relatively higher salinity brine 700*a* exits the initial panel 704. Spaced horizontal baffles 720*a*, 720*b*, 720*c* are visible on the tail panels. The baffles are described in more detail below.

In one embodiment, the process fluid travels through the headers via a pipe structure. The pipe structure may have a variety of configurations. FIG. 3D is a cross section at 900'-900" in FIG. 3A illustrating one embodiment 900 of a pipe structure. In one embodiment, the pipe structure 3D comprises fiber reinforced plastic. Referring to FIG. 3D, in this embodiment, the header comprises a rectangular support structure 902. In one embodiment, a pipe 904 is retained within the rectangular support structure 902. In one embodiment, the rectangular support structure 902 is a solid structure defining a bore therethrough. In FIG. 3D, the rectangular support structure 902 is a frame with a pipe 904 extending therethrough. In one embodiment, the rectangular support structure 902 and the pipe 904 comprise fiber reinforced plastic. In one embodiment, the rectangular support structure comprises one or more pressure equalizer openings 904*a*-*d*. In this embodiment, the contact points between the rectangular support structure 902 and the pipe 904 are secured using any suitable means. In one embodiment, the contact points between the rectangular support structure 902 and the pipe 904 are secured using cement, adhesive, or other suitable material. In one embodiment, epoxy cement is used to secure the rectangular support structure 902 to the pipe 904. In one embodiment, gasket material 906*a* is provided between frames at opposed sides of the rectangular support structure 902.

In one embodiment, the plurality of hollow fibers 34 (or 14, 24 in FIGS. 1 and 2, respectively) extend through a contact structure 906 (FIG. 3D) or 1006 (FIG. 3E) adapted to retain the plurality of HFs 34 in a loosely packed arrangement. The contact structure 906 (or 1006 in FIG. 3E) may be any suitable material (2000 in FIG. 8). In one embodiment, the contact structure 906 (or 1006 in FIG. 3E) comprises a suitable thermosetting material. In one embodiment, the contact structure 906 is selected from the group consisting of epoxy, polyurethane, and combinations thereof. As seen in FIG. 3D, the ends 13 (FIG. 1A) of the hollow fibers 34 empty into the pipe 904.

FIG. 8 is a cross section through a contact structure 906. The contact structure 906 or 1006 (FIG. 3E) comprises cured potting material 2000 with embedded alternating rows of HFs 34. In one embodiment, the embedded alternating rows of HFs 34 form abutting rows of hexagonal structures 2006 around a central HF 34*c*. The contact structure 906 or 1006 (FIG. 3E) may be made in any desired size. In one embodiment, the contact structure 906 or 1006 has a width 2003 (3008 in FIG. 19A) of about 55-105 mm. In one embodiment, the contact structure 906 or 1006 has a thickness (3010 in FIG. 19A) of about 20-60 mm. In one embodiment, the contact structure 906 or 1006 has a length 2001 (3006 in FIG. 19A) of up to 3,000 mm (3 m).

The inner and outer diameter of the HFs 34 will vary depending upon the application and process parameters. In one embodiment, referring to FIG. 9*a*, the HFs 34 have an outer diameter $D_o$ of from about 200-3,000 micrometers (0.2-3 mm). The outer diameter ($D_o$) will vary depending upon the desired feed pressure. HFs having a smaller outer diameter ($D_o$) will withstand higher feed pressures. For example, HFs having an outer diameter ($D_o$) of 0.2 mm for reverse osmosis desalination can withstand feed pressures as high as 70 bars. In contrast, HFs having an outer diameter ($D_o$) of 3 mm for water microfiltration can withstand relatively lower feed pressure of just a few bars.

In one embodiment, the outer diameter ($D_o$) of the HFs 34 is: 0.2 mm; 0.3 mm; 0.4 mm; 0.5 mm; 0.6 mm, 0.7 mm; 0.8 mm; 0.9 mm; 1 mm; 1.1 mm; 1.2 mm; 1.3 mm; 1.4 mm; 1.5 mm; 1.6 mm; 1.7 mm; 1.8 mm; 1.9 mm; 2.0 mm; 2.1 mm; 2.2 mm; 2.3 mm; 2.4 mm; 2.5 mm; 2.6 mm; 2.7 mm; 2.8 mm; 2.9 mm; or 3.0 mm. In one embodiment, the HFs 34 have an inner diameter ($D_i$) of about: 0.05 mm; 0.06 mm; 0.07 mm; 0.08 mm; 0.09 mm; 0.1 mm; 0.2 mm; 0.3 mm; 0.4 mm; 0.5 mm; 0.6 mm; 0.7 mm; 0.8 mm; 0.9 mm; 1 mm; 1.1 mm; 1.1 mm; 1.2 mm; 1.3 mm; 1.4 mm; 1.5 mm. The size of the space between HFs (2007, FIG. 9) will vary depending upon parameters of the process for which the HF panel 10 will be used, particularly the flow dynamic analysis (Reynolds number).

Figure 9:
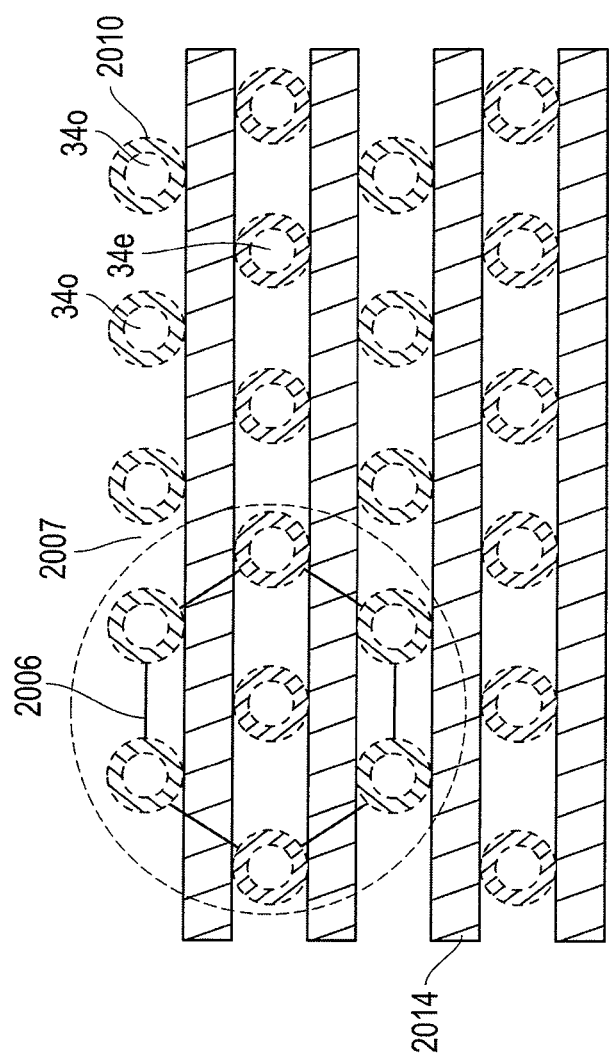
FIG. 9 is a cross section through the rows of HFs 34 that extend between contact structures in an intermediate phase during assembly with spacers therebetween.

FIG. 9 depicts a cross section through the rows of HFs 34 and spacers 2014 that extend between the contact structures 906 in an intermediate phase during assembly. In this embodiment, a row 2010 comprising an odd number of HFs 34*o* alternates with a row 34*e* comprising an even number of HFs, the repetition of the rows thereby forming the hexagonal structures 2006. In one embodiment, the alternate rows of HFs 34*o*, 34*e* are separated along their length between contact structures 906 or 1006 by a spacer 2014. The spacer 2014 may be made of any stackable, nonstick, easily removable flat sheet of material. In one embodiment, the spacer 2014 comprises a material selected from the group consisting of laminated cardboard, polymeric material, wooden veneer, fiberglass sheet, sheet of paper, and combinations thereof. In one embodiment, the spacer 2014 comprises laminated cardboard.

Figure 18A:
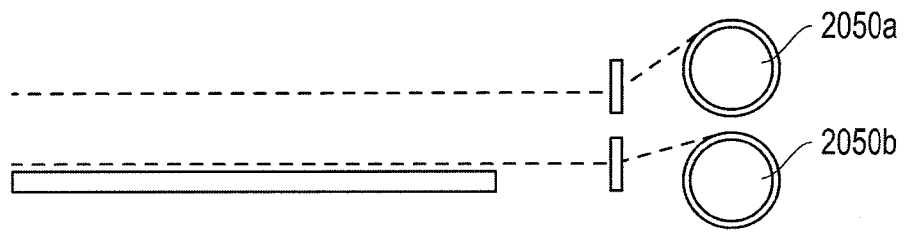
FIG. 18A is a side view of an assembly for manufacturing the membrane element comprising two rolls one for the layer of even HFs and the second for the layer of odd HFs.
Figure 18B:
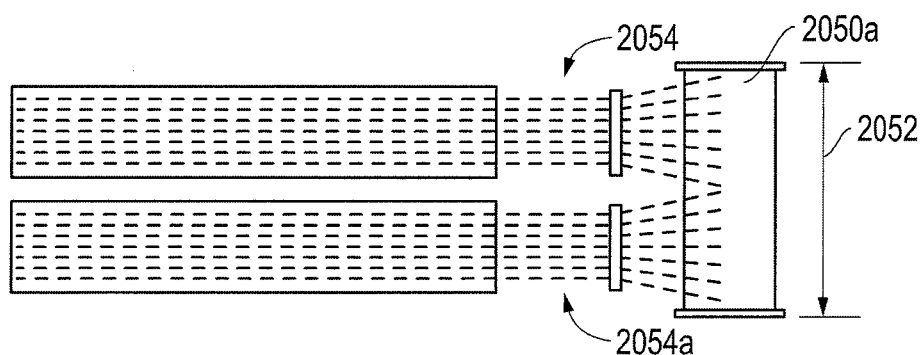
FIG. 18B is a top view of an assembly for manufacturing the membrane element comprising a wide HF wrap beam (roll) supporting two simultaneous HF panels assembly lines.

FIGS. 10-17 and 18A-18G illustrate suitable assemblies and processes for making the structures depicted in FIGS. 8 and 9. The HF's may be provided in a variety of forms. Such forms include, but are not necessarily limited to rolls, spools, reels, or wrap beam assemblies. FIG. 18A is a side view of an embodiment in which a first roll 2050*a* comprises HF's having a first spacing (in one embodiment, an even number of HFs), and a second row 2050*b* comprising HFs having an alternating spacing (an odd number of HFs). In one embodiment, illustrated in FIG. 18B, the roll 2050*a* is sufficiently wide (line 2052) that a plurality of HF stacks 2054, 2054*a* are made using a single roll 2050*a*.

Figure 18C:
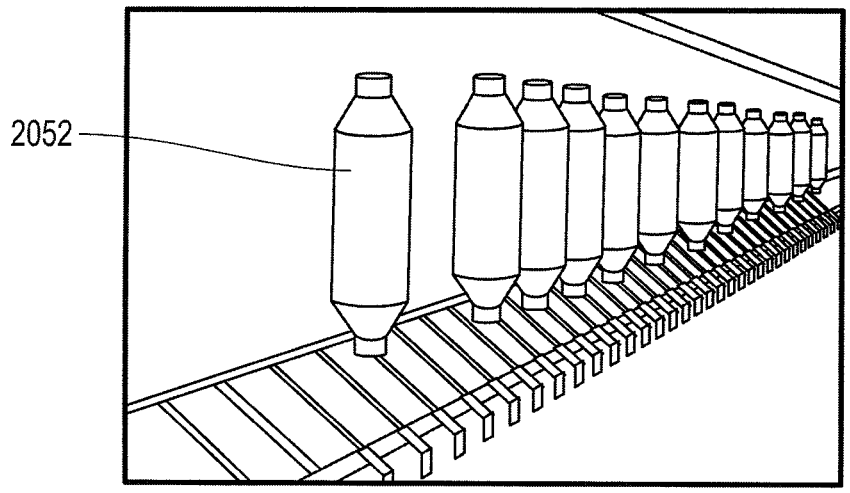
FIG. 18C is a perspective view of an assembly for manufacturing the membrane element comprising multiple spools of HFs.
Figure 18D:
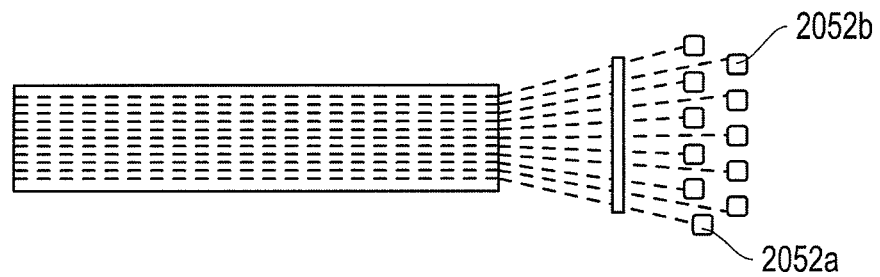
FIG. 18D is a schematic top view of an assembly comprising a first spool row comprising an even number of HFs alternating with a second spool row comprising an odd number of HFs.
Figure 18E:
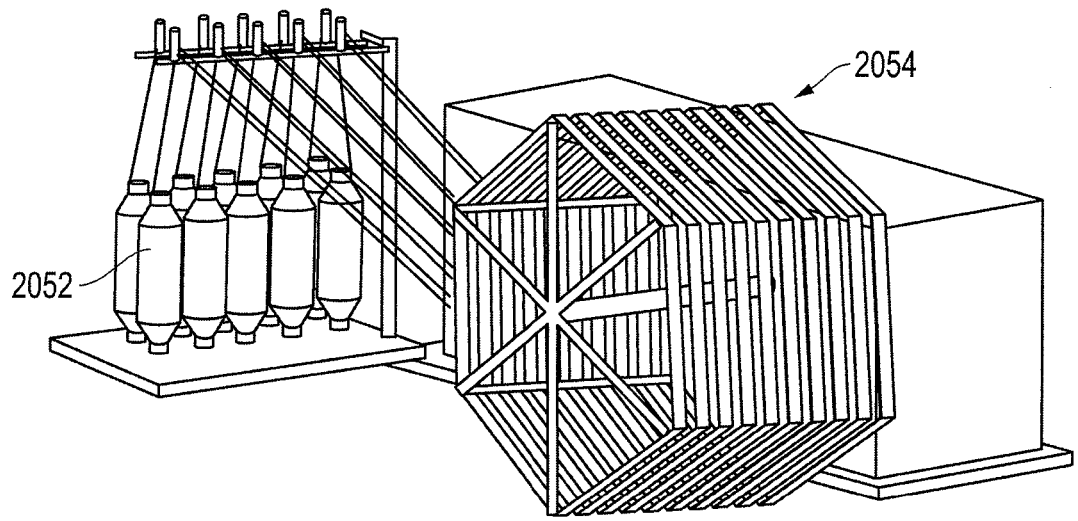
FIG. 18E is perspective view of an assembly for manufacturing reels of HFs from a plurality of spools.
Figure 18F:
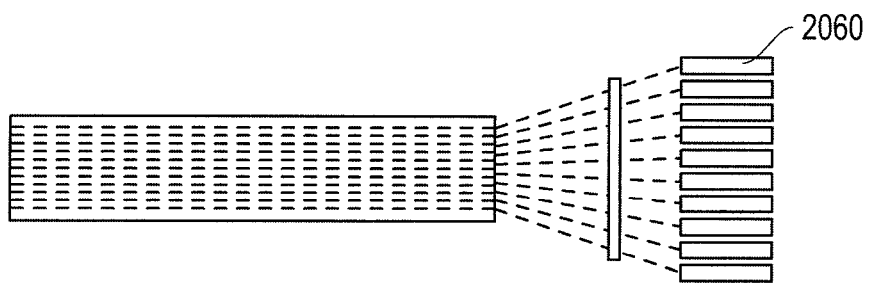
FIG. 18F is a schematic top view of an assembly comprising a plurality of adjacent reels of HFs which may be spaced, as required, to produce the alternating rows of odd an even HFs.
Figure 18G:
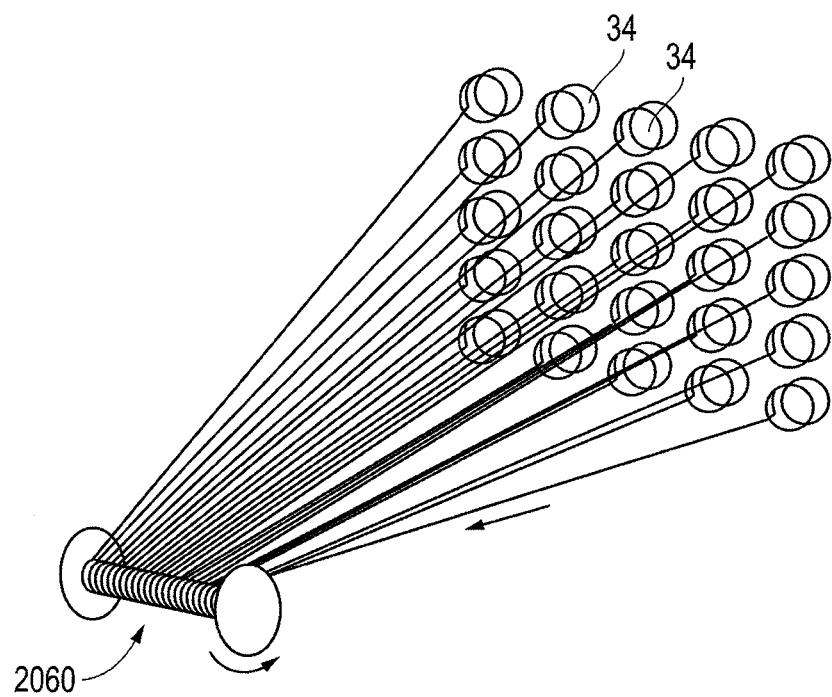
FIG. 18G is a schematic view of a wrap beam assembly with the plurality of HFs extended from HF reels or spools being brought from different sources.

FIG. 18C is a perspective view of an assembly comprising a plurality of vertically adjacent spools 2052 of HFs arranged in rows. In one embodiment, horizontally adjacent spools are used (not shown). FIG. 18D is a schematic top view of an assembly comprising a first spool row 2052*a* comprising an even number of HFs alternating with a second spool row 2052*b* comprising an odd number of HFs. FIG. 18E is a perspective view of an assembly for manufacturing reels 2054 of HFs from a plurality of spools 2052. FIG. 18F is a schematic top view of an assembly comprising a plurality of adjacent reels 2060 of HFs which may be spaced, as required, to produce the alternating rows of odd and even HFs. FIG. 18G is a schematic view of a wrap beam assembly 2060 with the plurality of HFs 34 extended from therefrom, which also may be used in an assembly to make the membrane assembly.

In one embodiment, two or more loom heddles 2017 (FIGS. 10 and 11) part alternating rows 34*o*, 34*e* of HFs (FIG.

9). The alternating rows of 34o, 34e of HFs may have a variety of arrangements. In one embodiment, the loom heddles part rows with an even number of HFs 34e alternating with rows comprising an odd number of HFs 34o. The process will be described in more detail in connection with a loom heddle. Persons of ordinary skill in the art will recognize how to use rolls, spools, reels, or wrap beam assemblies in a similar process.

In one embodiment, a HF assembly platform 2018 is provided adjacent to the HF loom heddle 2016. Referring to FIG. 11, in one embodiment, a first spacer 2014a is provided on the HP assembly platform 2018. In one embodiment, a first row comprising an odd number of spaced HFs 34o is extended lengthwise across the first spacer 2014a. In one embodiment, the opposed ends 2015 of HFs opposite to the loom heddle 2016 are weighted or engaged to maintain the HFs extended along the length of the HF assembly platform 2018. In one embodiment, the opposed ends 2015 of the HFs are weighted or engaged sufficiently to extend the HFs. In one embodiment, one or more of the opposed ends 2015 of the HFs are engaged by a suitable clamp (not shown). In one embodiment, the clamp is lined with an elastic material to reduce deformation of the HFs engaged in the clamp.

The elastic material may be of natural origin, such as natural rubber or cork, or of synthetic origin, such as thermoplastic elastomers, including styrenic elastomers, polyolefins, polyurethanes, polyamides, and combinations thereof. In one embodiment the elastic material is thermoplastic elastomer including, but not necessarily limited to those selected from the group consisting of silicon elastomer, neoprene, isoprene, butyl rubber, polymer flexible foam, and combinations thereof. Generally, these elastic materials have a Young's Elasticity Modulus of less than 1 GPa and specific gravity of less than 1000 kg/m$^3$. In one embodiment, the elastic material is rubber. In one embodiment, all of the opposed ends 2015 of the HFs are engaged in a single clamp having a suitable width and sufficient weight or tension to straighten the HF on the HF assembly platform 2018, but without stretching the HFs.

Figure 13:
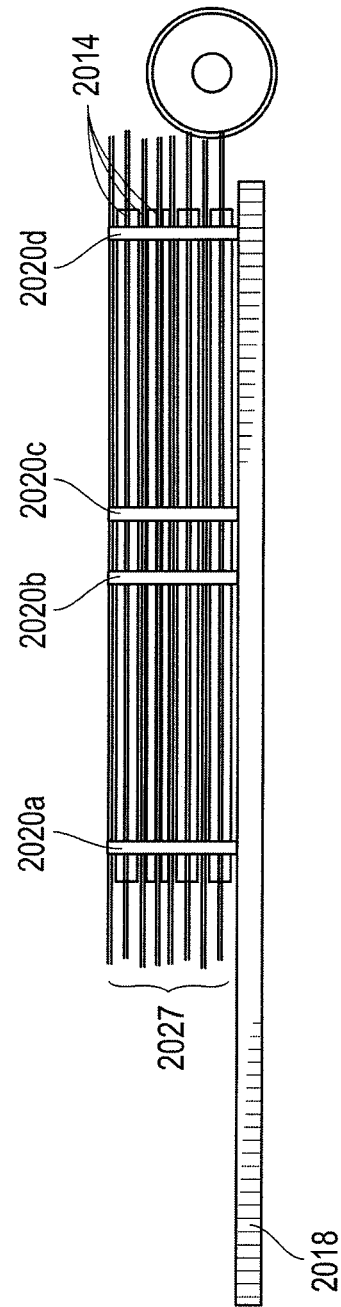
FIG. 13 is a side view of the assembly of FIG. 12.

In one embodiment, a spacer 2014b is placed over the first row of HFs 34o. In one embodiment, a next row 34e comprising an even number of HFs is extended across the second spacer 2014b. Referring to FIG. 13, the process is repeated until a stack comprising the desired number of rows of HFs 34o, 34e (FIG. 9) is formed. The number of rows of HFs 34o, 34e will vary with the desired size of the contact structure 906 and with the outer diameter ($D_o$) of the HFs 34. In one embodiment, the depth of the stack of rows of HFs (2027 in FIG. 13, 3005 in FIG. 19A) is 40 mm. In this embodiment, a stack comprising HFs having an outer diameter ($D_o$) of 1 mm will comprise from about 36 to about 48 rows of HFs. Processes using HFs having a larger outer diameter ($D_o$), for example of about 2 mm, will comprise about 16 to about 24 rows of HFs.

In one embodiment, HF stack depth (2027 in FIG. 13, 3005 in FIG. 19A) is 40 mm., the HFs have an outer diameter ($D_o$) of less than 0.5 mm, and the stack comprises from about 64 to about 80 rows of HFs. Processes using HFs having a smaller diameter of 0.5 mm or less would include ISO power generation and reverse osmosis. In one embodiment, the stack comprises the following number of rows of HFs: 20 or more; 21 or more; 22 or more; 23 or more; 24 or more; 25 or more; 26 or more; 27 or more; 28 or more; 29 or more; 30 or more; 31 or more; 32 or more; 33 or more; 34 or more; 34 or more; 36 or more; 37 or more; 38 or more; 39 or more; 40 or more. In one embodiment, the stack comprises 30 or less rows of HFs. In one embodiment, where relatively small size HFs are used, the space 2007 (FIG. 9) between HFs may be at or slightly greater than the outer diameter ($D_o$). This may require increasing the width 2003 (FIG. 8, 3008 in FIG. 19A) of the contact structure and/or adding one or more HFs panels 10, as needed.

The stack may have any suitable HF stack depth (2027 in FIG. 13, 3005 in FIG. 19A). In one embodiment, the HF stack depth 2027, 3005 is about 30 mm or more; 35 mm or more; 40 mm or more; 45 mm or more; 50 mm or more; 55 mm or more; 60 mm or more; 65 mm or more; 70 mm or more. In one embodiment, the HF stack depth is 80 mm or less.

In one embodiment, the HF assembly platform 2018 (FIG. 10) has a width 2023 of from about 500 mm to about 3 m or more, depending upon how many membrane elements are being made on the HF assembly platform. In one embodiment, the HF assembly platform 2018 has a width of about 500 mm or more; 600 mm or more; 700 mm or more; 800 mm or more; 900 mm or more; 1 m or more; 1.1 m or more; 1.2 m or more; 1.3 m or more; 1.4 m or more; 1.5 m or more; 1.6 m or more; 1.7 m or more; 1.8 m or more; 1.9 m or more; 2 m or more; 2.1 m or more; 2.2 m or more; 2.3 m or more; 2.4 m or more; 2.5 m or more; 2.6 m or more; 2.7 m or more; 2.8 m or more; 2.9 m or more; or 3 m or more. The HF assembly platform 2018 has a length of several times of its width. In one embodiment, the contact structure 906 of FIG. 19A has a length (2001, FIG. 8) of 3 meters or less. In one embodiment, the total stack depth 2027 (FIG. 13, 3005 of FIG. 19A) occupies about 75% of the width (2003, FIG. 8, 3010 in FIG. 19A) of the contact structure 906.

Figure 12:
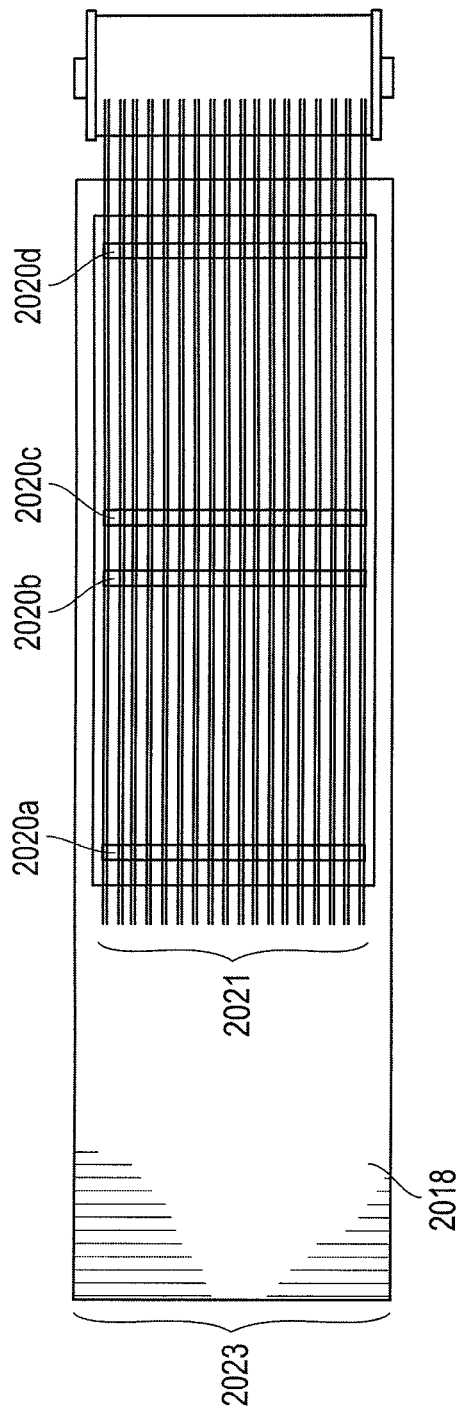
FIG. 12 is a top view of an assembly of FIG. 11 during manufacture of the HF panels.

When aligned, the spacers 2014a, 2014b of FIG. 10 form a plurality of HF potting chambers 2020a-d of FIGS. 12 and 13 to form a plurality of HF panels 10. In one embodiment, referring to FIG. 17A, the spacers are simple, unattached sheets 2014a, 2014b. The sheets 2014a, 2014b may have a variety of shapes as long as they define the potting chambers (alone, or in combination with surrounding structures), provide adequate separation of the alternating rows of HFs 34o, 34e, and are easily removable. Referring to FIG. 15, each spacer 2014 comprises a sheet of material extending between opposed ends 2021a, 2021b and opposed longitudinal edges 2022a, 2022b. The potting chambers 2020a-2020d comprise slots through the spacers 2014 extending from the longitudinal edge 2022a to the opposed longitudinal edge 2022b. The distance between potting chambers 2020a and 2020b, or 2020c and 2020d, etc., form the desired length of HF in between these chambers. Each potting chamber 2020a-d will form a contact structure 906 (FIG. 16, FIG. 19A) or 1006 (FIGS. 3D and 3E). In one embodiment, the spacers 2014 are reusable durable sheets adapted to consistently produce potting chambers 2020a-d having predetermined dimensions.

In one embodiment, the spacer 2014 also comprises an intermediate slot 2026 of FIG. 15 between potting chambers 2020a-2020d. The intermediate slot(s) 2026 divide the relatively long section of spacer 2013 between opposed potting chambers, e.g. 2020c and 2020d, into smaller sections for ease in later side removal of the spacer 2014.

Referring back to FIG. 13, when the spacers 2014 are placed between the layers of HFs, the slots align to form the potting chambers 2020a-2020d. The resulting potting chambers 2020a-2020d have well defined dimensions, orientation, careful alignment of HFs and relatively smooth internal surfaces. In one embodiment, referring to FIG. 14, an upper edge 2030b of each potting chamber fluidly communicates with a source of potting material 2000 (not shown). In one embodiment, a lower edge 2030a of each potting chamber may fluidly communicate with a source of potting material 2000.

In one embodiment, suitable provisions are made to prevent the potting material 2000 from filling unintended areas. In one embodiment, a petroleum based malleable sealant is applied to the surfaces of the potting chambers 2020a-2020d defined by the slots, including any gaps at the surfaces. In one embodiment, the petroleum based malleable sealant is smoothed using any suitable method to avoid damaging the HFs or the contact structure 906 during separation after curing the contact structure 906. In one embodiment, the petroleum based malleable sealant is smoothed using a brush or air stream. In one embodiment, the petroleum based malleable sealant is applied between HFs in spaces 2006, 2007 (FIG. 9) between HFs. In one embodiment, the petroleum based malleable sealant is applied to portions of spaces (2007, FIG. 9) adjacent to the contact structure 906 to a sufficient distance to prevent invasion of the potting material 2000 into the spaces 2007. In one embodiment, the petroleum based malleable sealant is petroleum jelly, preferably Vaseline. In one embodiment, a 10-15 mm layer of the petroleum based malleable sealant is applied around the inside of each potting structure 2020a-d. In one embodiment, the layer of petroleum based malleable sealant has a thickness on the surface of the contact structure (not shown) that is equivalent to the HF diameter ($D_o$), or about: 0.5 mm or more; 1 mm or more; 2 mm or more; 3 mm or more. In one embodiment, the layer of petroleum based malleable sealant has a width of 15 mm or less. In one embodiment, the petroleum based malleable sealant is applied each time a new HF is strung across the potting chamber or applied when a spacer 2014 is placed.

In one embodiment, after all of the desired rows of HFs 34o, 34e and spacers 2014 are stacked, and after forming the potting chamber and trimming its rough edges, potting material is poured or injected into the chamber and subjected to setting conditions. In one embodiment, liquid epoxy resin of polymeric or semi-polymeric material is poured into the chamber and allowed to set for about an hour until the potting material solidifies. Thereafter, the spacers are removed.

Figure 16:
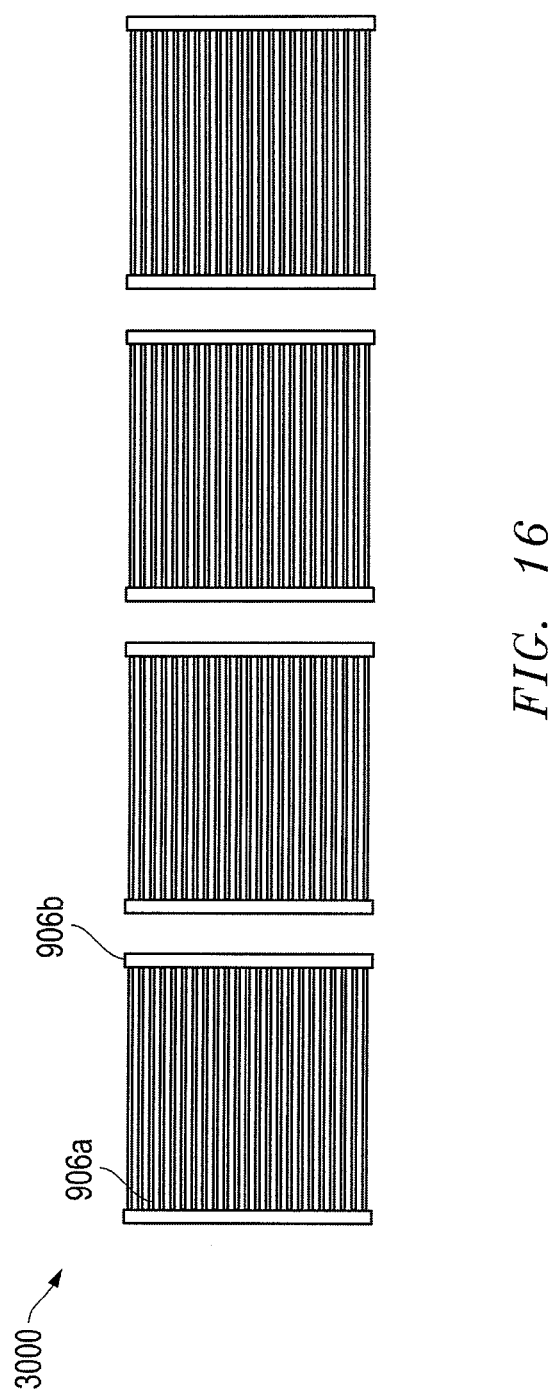
FIG. 16 is a perspective view of the HF membrane element comprising opposed contact structures with layers of HFs extending therebetween.

Once material 2000 sets, the contact structures 906a, 906b (FIG. 16) are formed. In one embodiment, a plurality of membrane elements 3000 (FIG. 16, FIG. 19A) are formed adjacent to one another (see FIG. 18). In this embodiment, the membrane elements 3000 (FIG. 16, FIG. 19A) are separated. In one embodiment, the spacers 2014 are removed, leaving the membrane elements 3000 comprising the HF's 34 extending therebetween. In one embodiment, the portion of HF's 34 extending between adjacent potting chambers (e.g., between 2020b and 2020c in FIGS. 12 and 13) is cut to produce the membrane element 3000 (FIG. 16, FIG. 19A). In one embodiment, the outer edges of the potting chambers are smoothed using industrial method. The result is membrane element 3000 comprising opposed contact structures 906a, 906b (FIG. 16).

Figure 17:
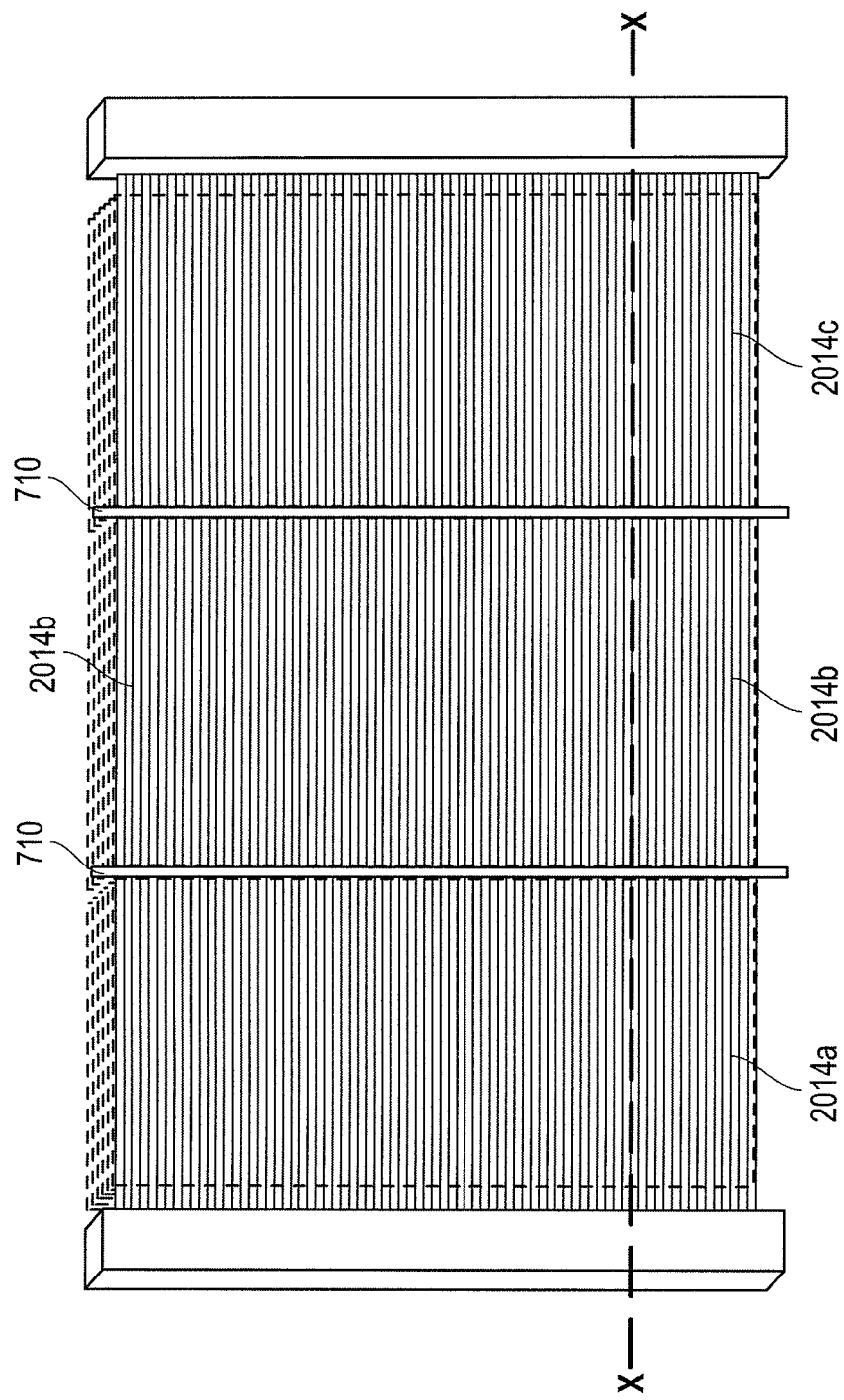
FIG. 17 is a top view of a HF membrane element with HFs extending between opposed contact structures showing a set of spacers aligned with finished baffles.
Figure 17A:
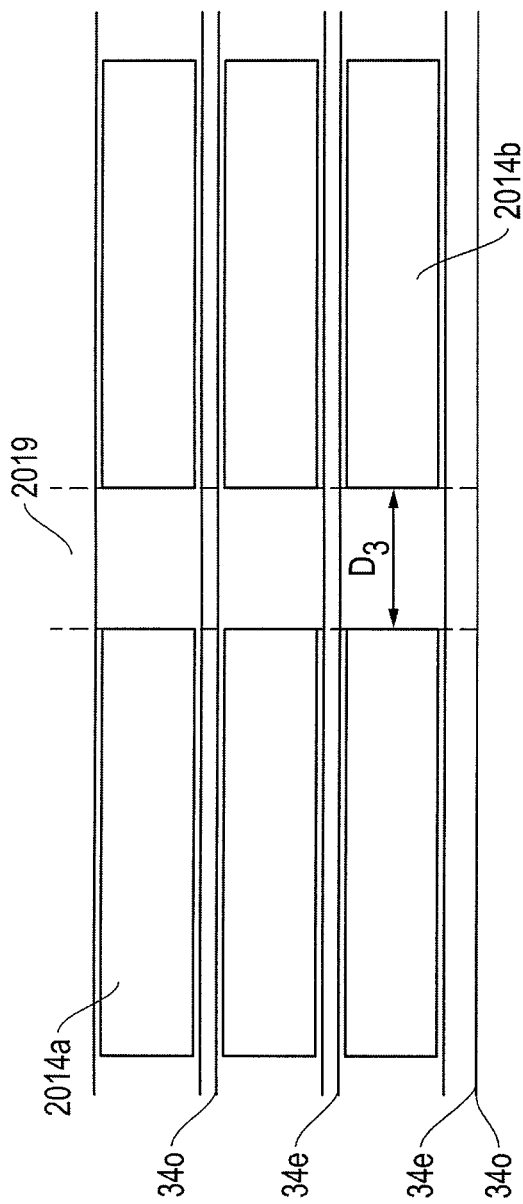
FIG. 17A is a cross section through FIG. 17 at line X-X before injecting potting material.

The size of the HF panels 10 may vary depending upon a variety of factors. In one embodiment, typically in larger HF panels 10 of over 300 mm in length, intermediate baffles may be required to retain the position of HFs and to avoid damage to the HFs in relatively high turbulent flow, particularly during startup of operation. In one embodiment, the baffles 710, 720 (FIG. 3G) are made during the potting procedure. In this embodiment, referring to FIG. 17, the spacers 2014a, 2014b, 2014c are rectangular and spaced apart adjacent to one another across the HFs 34. Referring to FIG. 17A, when the spacers 2014a-2014c are stacked between the even layers of HFs 34e and the odd layers of HFs 34o, spacer potting chambers 2019 are formed. The spacer potting chambers 2019 have well defined dimensions, orientation, careful alignment of HFs and relatively smooth internal surfaces.

In one embodiment, suitable provisions are made to prevent the potting material 2000 (FIG. 8) from filling undesired areas. In one embodiment, a petroleum based malleable sealant is applied to the surfaces of the spacer potting chambers 2019, including any gaps at the surfaces. In one embodiment, the petroleum based malleable sealant is smoothed using any suitable method. In one embodiment, the petroleum based malleable sealant is applied in spaces surrounding the HFs 34 adjacent to the spacers 2014a-c to a sufficient distance to prevent invasion of the potting material 2000 into the spaces. In one embodiment, the petroleum based malleable sealant is applied each time a new HF is strung across the potting chamber.

Figure 17B:
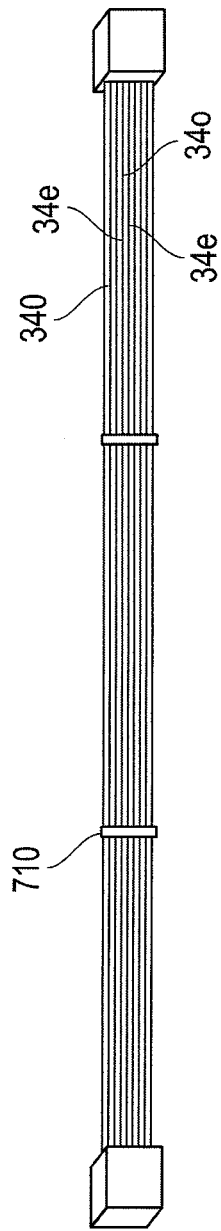
FIG. 17B is a cross section through FIG. 17 at line X-X after injecting and curing potting material.

In one embodiment, after all of the desired rows of HFs 34o, 34e and spacers 2014 and 2014a-c are stacked, the material 2000 is injected in fluid form into the spacer potting chambers 2019 (FIG. 17A) and exposed to curing conditions. Once material 2000 cures, the baffles 710 (FIG. 17B) are formed. In one embodiment, the spacers 2014a-c are removed. FIG. 17B is a cross section through FIG. 17 at line X-X. The baffles 710 extend through and retain the HFs in a plane defined by the baffles. The baffles 710 may have a variety of sizes depending upon the size of the HF panel 10. In one embodiment, the baffles 710 have a thickness $D_3$ of from about 6.3 mm (¼ inch) to about 0.375 mm (⅜ inch). In one embodiment, opposed ends of the baffles 710 are glued to adjacent sides of HF frame (19, 19a, FIG. 1).

Accordingly, in one embodiment, the application provides a method of making a membrane element, the method comprising:

a. providing a plurality of detachable spacer structures having given dimensions;
b. placing one or more first spacer structures on an HF assembly platform;
c. extending a first row of first HFs with first spaces therebetween over the one or more first spacer structures aligned with the longitudinal axis of the HF assembly platform, forming a first longitudinal row of first HFs, the first spaces having a width effective according to flow dynamic calculations to maintain turbulence flow across and along surfaces of the hollow fiber membranes at a Reynolds Number of 3,000 or more;
d. placing one or more second spacer structures having the given dimensions over the first row of HFs aligned with the one or more first spacer structures;
e. extending an adjacent row of HFs with second spaces therebetween across the one or more second spacer structures aligned with the longitudinal axis of the HF assembly platform;
f. repeating (d)-(e) with additional rows of HFs and spacer structures, forming a stack of alternating rows of HFs and intervening spacer structures, the stack having a desired height, wherein vertically aligned adjacent surfaces of the stacked spacer structures define potting chambers at opposed ends of the HFs, the potting chambers defining an inner surface having predetermined dimensions.

In one embodiment, the method comprises:

g. applying a malleable sealant over the inner surface of the potting chambers, producing sealed potting chambers;
h. injecting thermosetting potting material into the sealed potting chambers;
i. curing the potting material, thereby forming a plurality of contact structures comprising HFs extending therebetween; and,
j. removing the intervening spacer structures.

In one embodiment, referring back to FIG. 3E, the header comprises a solid structure 1000 with a bore 1008 therethrough. The solid structure 1000 may have a variety of shapes. Suitable shapes include, but are not necessarily limited to, triangular shapes, rectangular shapes, pentagonal shapes, hexagonal shapes, cylindrical shapes, oblong shapes, and the like. In one embodiment, the solid structure 1000 is an elongated rectangular structure. The bore 1008 also may have a variety of shapes. In one embodiment, depicted in FIG. 3E, the solid structure 1000 is an elongated rectangular structure with an elongated cylindrical bore 1008 therethrough.

The solid structure 1000 may be made of any suitable material. In one embodiment, the solid structure 1000 is made of steel. In one embodiment, the steel is coated with a suitable corrosion protection material. Substantially any corrosion protection material may be used. In one embodiment, the corrosion protection material is Teflon. In one embodiment, the corrosion protection material is epoxy. In one embodiment, the solid structure 1000 is made of fiber reinforced plastic. In one embodiment, a portion of a side of the solid structure comprises a contact structure 1006 adapted to retain the plurality of HFs 14 in a loosely packed arrangement. The contact structure 1006 may be any suitable material. In one embodiment, the contact structure 1006 comprises a suitable thermosetting material. In one embodiment, the contact structure 1006 is selected from the group consisting of epoxy, polyurethane, and combinations thereof. As seen in FIG. 3D, the ends 13 (FIG. 1A) of the hollow fibers 34 empty into the pipe structure (904 in FIG. 3D, 1000 in FIG. 3E).

FIG. 3F is a cross section taken at line 3F-3F of FIG. 2. FIG. 3F is a cutaway/transparent frame perspective view of a HF panel 10 (FIG. 2) comprising the header 16 and an adjacent header 26 (FIG. 2). In FIG. 3F, the header 16 is a solid rectangular structure 902 comprising a pipe or bore 904 therethrough. The header 26 comprises a solid rectangular structure comprising a pipe or bore 913 therethough. As seen in FIG. 3F, process fluid travels from a header terminal box 16*aa*, through the pipe 904 and across the header 16 (FIG. 2) to an opposed header terminal box 16*aa'*. The process fluid entering the header terminal box 16*aa'* passes through the aperture 23 into the header terminal box 26*aa* of the header 26 and enters the pipe 913. The process is repeated for additional adjacent panels.

Leakage from adjacent header terminal boxes, such as 26*aa'* and 16*aa'* in FIG. 3F, similarly may be avoided using a variety of suitable sealing arrangements. For example, in one embodiment, a cylindrical sleeve (not shown) may extend through the adjacent apertures 23, 23*a* (FIG. 3F) and sealingly engage adjacent inside surfaces in each header terminal box. The sealing engagement may be fixed or flexible. In one embodiment, the sealing engagement is provided using o-rings between the outer surface of the sleeve and adjacent surfaces in the respective header terminal box. In one embodiment, adjacent frame surfaces are sealed to retain the feed flowing between the plurality of HFs and prevent high pressure feed flow escaping from the array. In one embodiment, adjacent frame surfaces are provided with sealing gaskets.

FIG. 6 is a cross section through an array comprising a square array casing 60. A rectangular or square array casing 60 may be used in a variety of circumstances. In one embodiment, a square array casing 60 is used where the pressure of the process fluid 62 inside the HF lumens is relatively high and the pressure of the feed is relatively low.

High Pressure Cells

In one embodiment, the array or a plurality of arrays are retained in a suitable pressure vessel. Suitable pressure vessels comprise an outer wall defining an interior having a cross section with a variety of configurations, including but not necessarily limited to a triangular configuration, a circular configuration, an elliptical configuration, and a rectangular configuration. In order to support the array of the present application within a pressure vessel, it is desirable to have two or more contact points between the outer surface of the array and the interior of the pressure vessel.

In one embodiment, high pressure cells are provided by placing the array or a plurality of arrays in a suitable pressure vessel. Suitable pressure vessels comprise an outer wall defining in interior having a cross section with a variety of configurations, including but not necessary limited to a triangular configuration, a circular configuration, an elliptical configuration, and a rectangular configuration.

In one embodiment, referring to FIG. 7, the pressure vessel 70 is circular in cross section. This embodiment provides four contact points 74*a*-74*d* between the inside wall of the pressure vessel 70 and corners of the array. These contact points 74*a*-74*d* support the array 30 within the pressure vessel. In one embodiment, the array 30 is provided with a sealing encasement 71 therearound. The sealing encasement may be any suitable sealant material effective to maintain a specified turbulence flow rate at the given feed operating pressure. In one embodiment, the encasement is shrink wrap or polypropylene. In one embodiment, one or more additional supports 76*a*-76*d* extend from a surface of the array casing to the interior of the pressure vessel, providing additional support. In this embodiment, there is a relatively large fluid flow area between (70*a*) between the interior of the pressure vessel and the array casing. The sealing encasement 71 is effective to prevent leakage or seeping of the high pressure relatively unprocessed raw feed (37, FIG. 3) to the processed feed flowing through the HF array (37*a*, FIG. 3) at relatively lower operating pressures. This embodiment is useful under a variety of conditions. In one embodiment, a circular or elliptical pressure vessel is useful with a relatively high pressure process fluid inside of the HFs and a relatively low pressure feed.

Water-Extraction/Water-Recovery System

In one embodiment, the HF panels are used in a system and process for water-extraction/water-recovery. Water-extraction/water-recovery may be important in a variety of situations. Such situations include, but are not necessarily limited to dialysis (removing water containing waste from blood in case of renal failure), recovering water from brine comprising one or more soluble salt, extracting water from an organic solution, and extracting water from a solution comprising radioactive contamination.

Solutes having lower molecular weights generally produce solutions having a higher osmotic pressure. Solutes having higher molecular weights generally produce solutions having a lower osmotic pressure. Accordingly, it is generally more efficient to extract water from solutions having relatively low osmotic pressure.

Flow rates during water-extraction/water-recovery generally are lower than flow rates during power generation. In one embodiment, flow rates during water extraction/water-recovery are in liter/sec, $m^3$/min or gallon/min. In large scale systems for water extraction, the flow rate may be $m^3$/sec.

In one embodiment, the HF panels are used to perform dialysis. In this embodiment, the HF membrane is a microfiltration membrane having a pore size range of from 0.1 to 10 micrometers. In this embodiment, the flow rate typically will be in cc/min.

In one embodiment, the HF panels are used in a system to recover water from brine (an aqueous solution comprising one or more soluble salts). In this embodiment, the HF panels comprise membranes of nanometer pore size, preferably less than 1 nanometer. In one embodiment, the HF panels are used to extract water from a feed comprising relatively low salinity brine. In one embodiment, the HF panels are used to extract water from a feed comprising 1% sodium chloride brine, which has an osmotic pressure of about 112 psi, using a process fluid comprising a 4% brine having an osmotic pressure of about 448 psi. In this embodiment, the permeate across the membrane (or tie-line) is one unit volume. Accordingly: 2 volumes of feed at 1% salinity leaves as 1 volume of permeate and 1 volume of concentrated feed at 2% salinity; and, 1 volume of process fluid at 4% salinity leaves as 2 volumes of diluted process fluid comprising the one volume of permeate, the diluted process fluid having 2% salinity. In this embodiment, the driving osmotic force (LMCD) is 162 psi.

In one embodiment, water is extracted from an organic solution. In one embodiment, water is extracted from sugarcane juice containing 10% sugar. In one embodiment, the process fluid is 4% salinity brine. In food processing application, extraction process could be the only required process, without the need for further treatment. The osmotic pressure of the sugar solution is only about 10% of the osmotic pressure of the sodium chloride solution. Accordingly, in one embodiment: 2 volumes of feed comprising a sugar solution entering at a sugar concentration of 10% would produce 1 volume of permeate (tie line) and 1.0 volume of concentrated feed having a sugar concentration of 20%. In one embodiment, 10 volumes of feed comprising a 1% sugar concentration would produce 1.0 volume of concentrated feed having a sugar concentration of 20%. In this case, since the solution is very diluted and contains food grade product, it would be economically prudent to use an invasive process such as reverse osmosis, as the first heatless concentration process, to concentrate the solution to 20% concentration, then followed by an extraction process to reach higher concentrations, which may require process feed at 6% salinity or higher. Extracted saline water might be concentrated with available waste heat or in a solar pond and reused for concentrating more sugar solutions.

In all embodiments, economics dictate apparatus configuration and process feed flow and composition.

In one embodiment, water is extracted from solutions comprising radioactive contamination. Advantageously, solutions comprising radioactive contamination generally comprise solutes having higher molecular weights; accordingly, such solutions tend to have a relatively low osmotic pressures. Radioactive contamination may take different forms. In one embodiment, the radioactive contamination comprises Cesium-137.

Cesium-137 is a dangerous radioactive material generated by the nuclear fission of uranium-235. Cesium-137 is a soft, malleable, silvery white metal and melting point of 28.4° C. and a molecular weight of 136.907. The half-life of cesium-137 is 30 years. Cesium-137 decays by emission of a beta particle, gamma rays and conversion to barium-137m. Cesium-137 is a major contributor to the total radiation released during nuclear accidents, as in case of Chernobyl and recently Fukushima-Daiichi nuclear plant of Japan.

In one embodiment, water is extracted from natural water supplies (normally used for potable water if it contains less than 500 ppm of dissolved solids) containing radioactive contamination. One cubic meter of water contaminated with Cesium-137 appears to contain just few grams of Cesium-137 that have negligible osmotic effect. In one embodiment, relatively pure water is extracted from water contaminated with Cesium-137, leaving concentrated Cesium-137. In one embodiment, the concentrated Cesium-137 is flushed from the extractor, as needed. In one embodiment, the extraction membranes are safely disposed, as needed.

In one embodiment, water is extracted (as permeate or tie-line) from a radioactive contaminated low salinity salt solution (for example 1% or 10,000 ppm salt). In one embodiment, the radioactive contamination comprises Cesium-137. In one embodiment, 2 volumes of feed comprising a 1% salinity brine comprising a given concentration of Cesium-137 is extracted to produce 1 volume of tie line and a concentrated radioactive feed product comprising 1 volume of water at 2% salinity and twice the concentration of Cesium-137. In one embodiment, 1 volume of process fluid at 4% salinity enters the lumens of the HF panels and leaves the HF lumens (plus the permeate or tie-line) as 2 volumes at of water at 2% salinity. In one embodiment, the volume of recycle (or storage) radioactive contaminated water leaving the extractor is decreased by using a process fluid that has an even higher salinity. In one embodiment, 2 volumes of radioactive contaminated water at 1% salinity is reduced to about Vi volume of concentrated recycle radioactive contaminated water at 8% salinity by using a process fluid (in the HF lumens) having a salinity of 4%. Such practice reduces the storage requirements for radioactive contaminated water and associated maintenance In one embodiment, the process fluid has a salinity of: 3% or more; 4% or more; 5% or more; 6% or more; 7% or more; 8% or more; 9% or more; 10% or more; 11% or more; 12% or more; 13% or more; 14% or more; 15% or more; 16% or more; 17% or more; 18% or more; 19% or more; 20% or more.

Physics and Thermodynamics

The use of the membrane element is rooted in the field of physics and pertains to the development of a chemical engineering conceptual process design, presenting a new vision in the energy field. The following discussion of basic physics and thermodynamics will assist in understanding the method and apparatus.

The first law of thermodynamics rules out the possibility of constructing a machine that can spontaneously create energy. However, the first law of thermodynamics does not rule out the possibility of transferring energy from one form into another.

Internal energy (U) generalized differential form can be presented as:

$$dU = TdS - pdV + \mu dN + \phi dQ + vdp + \psi dm + ldA + \ldots \quad \text{(Eq. 1)}$$

where, entropy S, volume V, amount of substance N, electric power Q, momentum p, mass m, area A, etc. are extensive properties and temperature T, pressure p, chemical potential $\mu$, electrical potential $\phi$, velocity v, gravitational potential $\psi$, surface tension l, etc. are energy-conjugated intensive quantities.

This generalized relation is reduced to account for osmotic effect as:

$$dU = TdS - pdV + \Sigma_i \mu_i dN_i \quad \text{(Eq. 2)}$$

$\mu_i$ is the chemical potential of the i-th chemical component, joules per mol.

$N_i$ (or $n_i$) is the number of particles (or moles) of the i-th chemical component.

In thermodynamics, the Gibbs free energy is a thermodynamic potential that measures the "useful" or process-initiating work obtainable from an isothermal, isobaric thermodynamic system. The Gibbs free energy is the maximum amount of non-expansion work that can be extracted from a closed system. This maximum can be attained only in a completely reversible process.

Gibbs free energy, $G_{(T, p, N)}$ attained in a reversible process can be presented in simplified form as: G=U+pV−TS. Expanding this relation in a differential form, with substitution of Eq. 2

$$dG=dU+d(pV)=d(TS)=TdS-pdV+\Sigma_i\mu_i dN_i+d(pV)=d(TS)=TdS=pdV+\Sigma_i\mu_i dN_i+pdV+Vdp-SdT-TdS \quad \text{(Eq. 3)}$$

Eliminating opposite sign terms, osmotic effect in terms of Gibbs free energy is:

$$dG=Vdp-SdT+\Sigma_i\mu_i dN_i \quad \text{(Eq. 4)}$$

Gibbs free energy when pressure and temperature are constant (dp=0 and dT=0), a condition for process reversibility, results in:

$$dG=\Sigma_i\mu_i dN_i \quad \text{(Eq. 5)}$$

To define the relation between pressure and chemical potential, the chemical potential in Eq. 6 is assumed to be negligible, then dG=Vdp, but since pV=nRT, from perfect gas equation of state, by substitution, dG=nRT dp/p. By integration between $p_o$ and p gives:

$$\Delta G=G_p-G_{po}=nRT\int dp/p=nRT \ln(p/p_o).$$

For one mole (n=1) and in term of chemical potential given earlier by Eq. 5

$$\mu=\mu^o+RT \ln(p/p_o) \quad \text{(Eq. 6)}$$

Derivation of this relation in terms of activity coefficient, considering real solution results in;

$$\mu_A=\mu_A^*+RT \ln a_A \quad \text{(Eq. 7)}$$

Then, osmotic pressure mathematical general form can be presented as:

$$\Delta\pi=\Delta p=RT\Delta C_s \quad \text{(Eq. 8)}$$

The osmotic pressure π was originally proposed by Nobel Laureate Van't Hoff and modified to include Staverman's osmotic reflection coefficient to become;

$$\pi=\Phi icRT \quad \text{(Eq. 9)}$$

Where:
π=osmotic pressure or force imposed on the membrane given in bars, atm, psi, etc.
Φ=Osmotic Reflection Coefficient (NaCl=0.93, $CaCl^2$=0.86, Mg $CaCl^2$=0.89, etc.),
i=Ions concentration per dissociated solute molecule ($Na^+$ and $Cl^-$ ions=2),
c=molar concentration of the salt ions,
R=gas constant (0.08314472 liter·bar/(k·mol)),
T=ambient temperature in absolute Kelvin degrees (20° C.+273°=293° K).

The average salinity of seawater is about 3.5% (35 gram/liter), comprising ocean salts as solute, mostly in the form of sodium chloride (NaCl). For simplicity of calculation, it is assumed that seawater contains 35 grams NaCl/liter. The atomic weight of sodium is 23 grams. The atomic weight of chlorine is 35.5 grams, so the molecular weight of NaCl is 58.5 grams. The number of NaCl moles in seawater is 35/58.5=0.598 mol/liter and the osmotic pressure of seawater is
$\pi$=[0.93][2][0.598 mol/liter][0.08314 liter·bar/(k·mol)][293 K]=27.11 bar Since one bar=100,000 Pascal (Pa) and one kilogram (force) per square centimeter ($kg_f/m^2$)=98066.5 Pascal, computation of osmotic pressure, π and energy of seawater ($SW_E$) and lake brine ($LB_E$) can be presented in several forms:
$\pi$=[27.11×10$^5$ Pa]/[98066.5 Pa/($kg_f$/$cm^2$)]=27.64 $kg_f/cm^2$ $\pi$=[27.64 $kg_f/cm^2$][m/100 cm][1000 $cm^3$/liter]=276.4 $kg_f$·m/liter a. $SW_E$=[276.4 $kg_f$·m/liter][9.80665 Joule/$kg_f$·m]=2711 Joule/liter=2.711 MJ/m$^3$
b. $SW_E$=[2711 Joule/liter][1 cal/4.184 J][1 kcal/1000 cal]=0.6479 kcal/liter
c. $SW_E$=[2711 Joule/liter][1000 liter/m$^3$]=2.710 MJ/m$^3$=0.751 kWh/m$^3$ For generating power substantially continuously, which typically is the case with power generation systems, the theoretical potential power capacity of this system is:
d. [2.711 MJ/m$^3$][1 m$^3$/s][3600 s]=9.759×10$^9$ J=[9.759×10$^9$ W·s][h/3600 s]=2,711 kWh
e. $SW_E$=[2,711 kWh][24 hrs/day][365 days/year]=23.75×10$^6$ kWh annually.

In me case of a hyper saline lake such as the Qattara Depression-Egypt, Chott El Jerid-Tunisia, Lake Torrens-Australia, or any typical natural or manmade domain, the amount of average salt concentration can reach saturation (359 gram/liter at 25 centigrade) mostly in the form of sodium chloride (NaCl). Considering lake salinity is 33% (330 gram/liter), then the lake brine osmotic pressure can be estimated as:

$\pi$=[0.93][2][5.641 mol/liter][0.08314 liter·bar/(k·mol)]·[293 K]=255.593 bar

For substantially continuous power generation, the theoretical potential power capacity of the lake brine (LB) of such system where; 1 W=J/s, 1 W·s=J, 1 kWh=3.6×10$^6$ J, is:

$LB_E$=[25.559 MJ/m$^3$][1 m$^3$/s][3600 s]=[92.0124×10$^9$ J][1 kWh/3.6×10$^6$ J]=25,559 kWh $LB_E$=[25,559 kWh][24 hrs/day][365 days/year]=223.897×10$^6$ kWh/year, per 1 m$^3$ per sec.

Regarding Induced Symbiotic Osmosis [ISO] membrane flux, the simplest equation to describe the relationship between osmotic, hydraulic pressures and water flux, $J_w$ is based on calculating the log mean concentration difference ("LMCD"). LMCD is a system driving force and it assists in realistic determination of equipment size and power generation. LMCD has been calculated for all design cases since it is a system efficiency parameter, particularly when energy regeneration efficiency is debatable.

$$J_w=A Kp[\Phi\Delta\pi@\Delta C_{lm}-\Delta P] \quad \text{(Eq. 10)}$$

Where $J_w$ is water flux, Kp is the hydraulic permeability of the membrane, A is membrane area, Δπ is the difference in osmotic pressures on the two sides of the membrane, ΔP is the difference in hydrostatic pressure where negative values of $J_w$ indicating reverse osmotic flow. Φ, reflective coefficient, $\Delta C_{lm}$ is log mean concentration difference (LMCD).

The calculated logarithmic mean concentration difference should be the same as or less than the membrane's limited operating pressure. The number of cells required in a particular power train can be determined based on: (a) the initial salinity of the feed and/or process fluid, (b) the operating pressures, and/or (c) a combination thereof. The logarithmic mean concentration difference may be reduced by increasing the number of cells. The logarithmic mean concentration difference may be increased by reducing the number of cells.

Concentration polarization results of accumulation of dissolved salt at the membrane surface, creating a relatively high localized osmotic gradient. This relatively high localized osmotic gradient reduces normal osmotically driven permeate diffusion and hinders membrane flux, in addition of blocking the flow pass. In general, membranes operating in induced osmosis mode are less susceptible to this phenomenon due to the low pressure imposed on membrane as compared with membranes in reverse osmosis service. In one embodiment, the feed is pretreated to remove suspended solids.

In one embodiment, membrane fouling and concentration polarization phenomenon are reduced by one or more of the following:

i. Maintaining turbulence flow across and along membrane surfaces preferably at a Reynolds' Number of 3,000 or more, 3,100 or more, 3,200 or more, 3,300 or more, 3,400 or more, 3,500 or more, preferably above 3,500. In one embodiment, excessive use of pumping energy is avoided if the Reynolds' Number is maintained at 6,000 or less. In one embodiment, the Reynolds Number is maintained at less than 6,000. Reynolds number is defined by the ratio of dynamic pressure ($\rho u^2$) and shearing stress ($\mu u/L$) and expressed in mathematical function as:

$$Re=(\rho u^2)/(\mu u/L)=\rho uL/\mu \qquad (Eq. 11)$$

Where;
  a. Re=Reynolds Number (non-dimensional)
  b. $\rho$=density (kg/m$^3$, lb$_m$/ft$^3$)
  c. u=velocity cross section area of the duct or pipe (m/s, ft/s)
  d. $\mu$=dynamic viscosity (Ns/m$^2$, lb$_m$/s ft)
  e. L=characteristic length (m, ft) also known as the hydraulic diameter, d$_h$ for ducts, passageways, annuli, etc.
    Where d$_h$=(4) (cross sectional area of duct)/wetted perimeter
  f. v=kinematic viscosity (m$^2$/s, ft$^2$/s)

ii. Side-mounting electromechanical vibrators on membrane array encasements. The electromechanical vibrators may operate at any effective frequency. In one embodiment, the electromechanical vibrators operate intermittently or continuously at a vibration of about 30 Hertz or more, 35 Hertz or more, 40 Hertz or more, 45 Hertz or more, 50 Hertz or more, 55 Hertz or more, 60 Hertz or more, 65 Hertz or more, or 70 Hertz. The electromechanical vibrators may travel any effective distance. In one embodiment, the electromechanical vibrators travel a distance of 3 mm or more, 3.5 mm or more, 4 mm or more, 4.5 mm or more, 5 mm or more, 5.5 mm or more, or 6 mm;

iii. Minimizing contact points and associated laminar or stagnant flow between fibers, which can produce salt build up between contacting fibers, by relatively loosely mounting the semipermeable membranes. In one embodiment hollow fibers are relatively loosely packed and retained within a frame;

iv. Regularly flushing the membranes with desalinated fluid or water upon dropping of power generation or desalination quality. Flushing may occur at substantially any designated power drop. In one embodiment, flushing occurs at power drops of 1% or more, 2% or more, 3% or more 4% or more, 5% or more, 6% or more, 7% or more, 8% or more, 9% or more, or 10%;

v. Using a hydrophilic semipermeable membrane such as cellulose acetate which tends to avoid formation of foreign matter on the membrane surface and tends to mitigate concentration polarization.

vi. Using surfactants in enclosed middle cells;

vii. Continuously on-line monitoring salinity changes within each loop. In one embodiment, salinity is automatically adjusted by injecting or withdrawing saline solution. In one embodiment, salinity is adjusted by adding water having a desired salinity.

viii. Saving power and making impeding fouling build up on the semipermeable membrane, in one embodiment, by using dual diaphragm pumping systems.

Persons of ordinary skill in the art will recognize that many modifications may be made to the foregoing description. The embodiments described herein are meant to be illustrative only and should not be taken as limiting the invention, which will be defined in the claims.

I claim:

1. A method of making a membrane element adapted for use in water treatment and osmotic processes, the method comprising:
   a. providing a plurality of spacer structures having given dimensions;
   b. placing one or more first spacer structures on a hollow fiber ("HF") assembly platform;
   c. extending a first row of first hollow fibers ("HFs") with first spaces having a first width therebetween over the one or more first spacer structures aligned with the longitudinal axis of the HF assembly platform, forming a first longitudinal row of first HFs, wherein each HF comprises a hydrophilic semipermeable membrane defining an elongated lumen, the hydrophilic semipermeable membrane being adapted to achieve salt rejection of 98.5% or more and exhibiting a surface tension of 35 dynes/cm or more;
   d. placing one or more second spacer structures having the given dimensions over the first row of HFs aligned with the one or more first spacer structures;
   e. extending an adjacent row of HFs with second spaces having a second width therebetween across the one or more second spacer structures aligned with the longitudinal axis of the HF assembly platform;
   f. repeating (d)-(e) with additional rows of HFs and spacer structures, forming the membrane element comprising a stack of alternating rows of HF and intervening spacer structures, wherein the given dimensions, the first width, and the second width are effective according to flow dynamic calculations to maintain a Reynolds Number of 3,000 or more, the stack having a desired total stack depth, the stack maintaining a mechanical integrity at feed pumping pressure of 30 bars or higher, wherein vertically aligned adjacent surfaces of the stacked spacer structures define potting chambers at opposed ends of the HFs, the potting chambers defining an inner surface having predetermined dimensions.

2. The method of claim 1 further comprising:
   g. applying a malleable sealant over the inner surface of the potting chambers, producing seed potting chambers;
   h. injecting thermosetting potting material into the sealed potting chambers;
   i. curing the thermosetting potting material, thereby forming a plurality of contact structures comprising HFs extending therebetween; and,
   j. removing the intervening spacer structures.

3. The method of claim 1 wherein a plurality of membrane elements are formed in the same process, the process further comprising cutting the plurality of HFs extending between contact structures of adjacent membrane elements.

4. The method of claim 1 comprising extending the rows of HFs at proximal ends from one or more HF dispensing apparatus and engaging the rows of HFs at distal ends, thereby maintaining the HFs extended along the length of a rectangular base.

5. The method of claim 4 the dispensing apparatus comprises a loom heddle, the method comprising providing the first row and the adjacent row of HFs on one or more loom heddles.

6. The method of claim 1 wherein the desired total stack depth is about 30-80 mm.

7. A method of making a membrane element adapted for use in water treatment and osmotic processes, the method comprising:
   a. providing a plurality of spacer structures having given dimensions;
   b. placing one or more first spacer structures on a hollow fiber ("HF") assembly platform;
   c. extending a first row of first HFs with first spaces having a first width therebetween over the one or more first spacer structures aligned with the longitudinal axis of the HF assembly platform, forming a first longitudinal row of first HFs, wherein each HF comprises a hydrophilic semipermeable membrane defining an elongated lumen, the hydrophilic semipermeable membrane being adapted to achieve salt rejection of 98.5% or more and exhibiting a surface tension of 35 dynes/cm or more;
   d. placing one or more second spacer structures having the given dimensions over the first row of HFs aligned with the one or more first spacer structures;
   e. extending an adjacent row of HFs with second spaces having a second width therebetween across the one or more second spacer structures aligned with the longitudinl axis of the HF assembly platform, aligning the adjacent row of HFs with the spaces of the first mw of first HFs;
   f. repeating (d)-(e) with additional rows of HFs and spacer structures, forming the membrane element comprising a stack of alternating rows of HFs each aligned with spaces of one or more adjacent rows and separated by intervening spacer structures, wherein the given dimensions, the first width, and the second width are effective according to flow dynamic calculations to maintain a Reynolds Number of 3,000 or more, the stack having a desired total stack depth, the stack maintaining a mechanical integrity at feed pumping pressure of 30 bars or higher, wherein vertically aligned adjacent surfaces of the stacked spacer structures define potting chambers at opposed ends of the HFs, the potting chambers defining an inner surface having predetermined dimensions.

8. The method of claim 7 further comprising:
   g. applying a malleable sealant over the inner surface of the potting chambers, producing sealed potting chambers;
   h. injecting epoxy resin potting material into the sealed potting chambers;
   i. curing the epoxy resin potting material, thereby forming a plurality of contact structures comprising HFs extending therebetween; and,
   j. removing the intervening spacer structures.

9. The method of claim 7 wherein a plurality of membrane elements are formed in the same process, the process further comprising cutting the plurality of HFs extending between contact structures of adjacent membrane elements.

10. The method of claim 7 comprising placing two spacer structures having given dimensions over the HF assembly platform, and placing two spacer structures having the given dimensions over each row of HFs aligned with the one or more first spacer structures.

11. The method of claim 7 comprising extending the rows of HFs at proximal ends from one or more HF dispensing apparatus and engaging the rows of HFs at distal ends, thereby maintaining the HFs extended along the length of a rectangular base.

12. The method of claim 11 wherein the dispensing apparatus comprises a loom heddle, the method comprising providing the first row and the adjacent row of HFs on one or more loom heddles comprising rows comprising an odd number of spaced HFs offset from and alternating with rows comprising an even number of spaced HFs.

13. The method of claim 7 wherein the desired total stack depth is about 3080 mm.

14. A method of making a membrane element adapted for use in water treatment and osmotic processes, the method comprising:
   a. providing a plurality of spacer structures having given dimensions;
   b. placing one or more first spacer structures on a hollow fiber ("HF") assembly platform;
   c. extending a first row of first HFs with first spaces having a width therebtween from a loom heddle over the one or more first spacer structures aligned with the longitudinal axis of the HF assembly platform, forming a first longitudinal row of first HFs, wherein each HF comprises hydrophilic semipermeable membrane defining an elongated lumen, the hydrophilic semipermeable membrane being adapted to achieve salt rejection of 98.5% or more and exhibiting a surface tension of 35 dynes/cm or more;
   d. placing one or more second spacer structures having the given dimensions over the first row of HFs aligned with the one or more first spacer structures;
   e. extending a adjacent row of HFs with second spaces having the width therebetween from the loom heddle across the one or more second spacer structures aligned with the longitudinal axis of the HF assembly platform, aligning the adjacent row of HFs with the spaces of the first row of first HFs thereby maintaining the HFs extended along the length of the one or more first spacer structure;
   f. repeating (d)-(e) with additional rows of HFs and spacer structures, forming the membrane element comprising a stack of alternating rows of HFs each aligned with spaces of one or more adjacent rows and separated by intervening spacer structures, wherein the given dimensions and the width are effective according to flow dynamic calculations to maintain a Reynolds Number of 3.000 or more, the stack having a desired total stack depth, the stack maintaining a mechanical integrity at feed pumping pressure of 30 bars or higher, wherein vertically aligned adjacent surfaces of the stacked spacer structures define potting chambers at opposed ends of the HFs, the potting chambers defining an inner surface having predetermined dimensions.

15. The method of claim 14 further comprising:
   g. applying a malleable sealant over the inner surface of the potting chambers, producing sealed potting chambers;
   h. injecting epoxy resin potting material into the sealed potting chambers;
   i. curing the epoxy resin potting material, thereby forming a plurality of contact structures comprising HF extending therebetween; and,
   j. removing the intervening spacer structures.

16. The method of claim 14 wherein a plurality of membrane elements are formed in the same process, the process further comprising cutting the plurality of HFs extending between contact structures of adjacent membrane elements.

17. The method of claim 14 comprising placing two spacer structures having given dimensions over the HF assembly platform, and placing two spacer structures having the given dimensions over each row of HFs aligned with the one or more first spacer structures.

18. The method of claim 14 wherein the desired total tack depth is about 30-80 mm.

19. The method of claim 17 wherein a plurality of membrane elements are formed in the same process, the process further comprising cutting the plurality of HFs extending between contact structures of adjacent membrane elements.

20. The method of claim 19 wherein the desired total stack depth is about 30-80 mm.

* * * * *